(12) United States Patent
Maeda

(10) Patent No.: US 6,259,495 B1
(45) Date of Patent: Jul. 10, 2001

(54) LIQUID CRYSTAL DISPLAY PANEL AND METHOD OF MANUFACTURING THE SAME, INCLUDING A STRUCTURE FOR, AND A METHOD OF PREPARING, TERMINAL OR CONNECTING ELECTRODES FOR CONNECTING LIQUID CRYSTAL DISPLAY PANEL TO AN EXTERNAL DRIVE CIRCUIT

(75) Inventor: Akitoshi Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/233,961

(22) Filed: Jan. 20, 1999

(30) Foreign Application Priority Data

Jan. 20, 1998 (JP) .................................... 10-008718

(51) Int. Cl.$^7$ ........................................... G02F 1/136
(52) U.S. Cl. ........................ 349/42; 349/149; 349/152; 257/59
(58) Field of Search ........................... 349/42, 149, 152, 349/43, 141; 257/59, 72, 761, 763

(56) References Cited

U.S. PATENT DOCUMENTS

| | | | |
|---|---|---|---|
| 5,148,248 | * 9/1992 | Possin et al. | 357/23.7 |
| 5,264,728 | * 11/1993 | Ikeda et al. | 257/761 |
| 5,296,653 | * 3/1994 | Kiyota et al. | 174/250 |
| 5,316,975 | * 5/1994 | Maeda | 437/195 |
| 5,428,250 | * 6/1995 | Ikeda et al. | 257/761 |
| 5,614,728 | * 3/1997 | Akiyama | 257/57 |
| 5,821,622 | * 10/1998 | Tsuji et al. | 257/763 |
| 5,886,761 | * 3/1999 | Sasaki et al. | 349/122 |
| 5,917,198 | * 6/1999 | Maeda | 257/59 |
| 5,943,559 | * 8/1999 | Maeda | 438/149 |
| 6,043,859 | * 3/2000 | Maeda | 349/143 |

FOREIGN PATENT DOCUMENTS

| | | |
|---|---|---|
| 60-260920 | 12/1985 | (JP) . |
| 3-240027 | 10/1991 | (JP) . |
| 03280021A | * 12/1991 | (JP) . |
| 6-148658 | 5/1994 | (JP) . |
| 6-273782 | 9/1994 | (JP) . |
| 7-325321 | 12/1995 | (JP) . |
| 8-179372 | 7/1996 | (JP) . |
| 9-244055 | 9/1997 | (JP) . |
| 9-293877 | 11/1997 | (JP) . |

* cited by examiner

Primary Examiner—William L. Sikes
Assistant Examiner—Tarifur R. Chowdhury
(74) Attorney, Agent, or Firm—Sughrue, Mion, Zinn, Macpeak & Seas, PLLC

(57) ABSTRACT

A simple method for preventing oxidization of an aluminum surface of terminal electrode, increase of pressure contact resistance, unstability and reduction of connection reliability is provided. In a terminal electrode part on a reactive matrix substrate, for being connected to an external drive circuit, connecting electrodes are formed by using aluminum or an aluminum alloy, at least their surfaces connected to TCP are covered with an insulating film of aluminum oxide or consisting of a laminate film of aluminum oxide aluminum hydroxide, and the insulating film is selectively removed in a step subsequent to the final step in a cell formation process. In this way, adverse effects of the heat treatment processes such as the annealing in the array formation process and the orientation film sintering of the cell formation process and the oxidization of the connecting electrode surface in the washing.

8 Claims, 13 Drawing Sheets

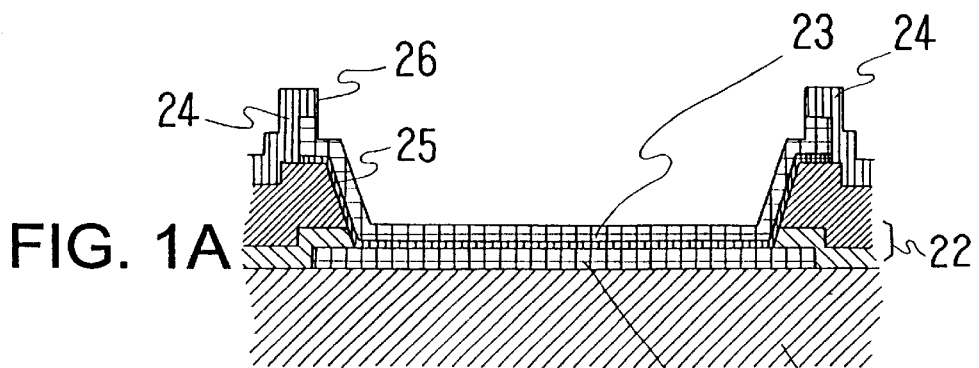
FIG. 1A
FIG. 1B
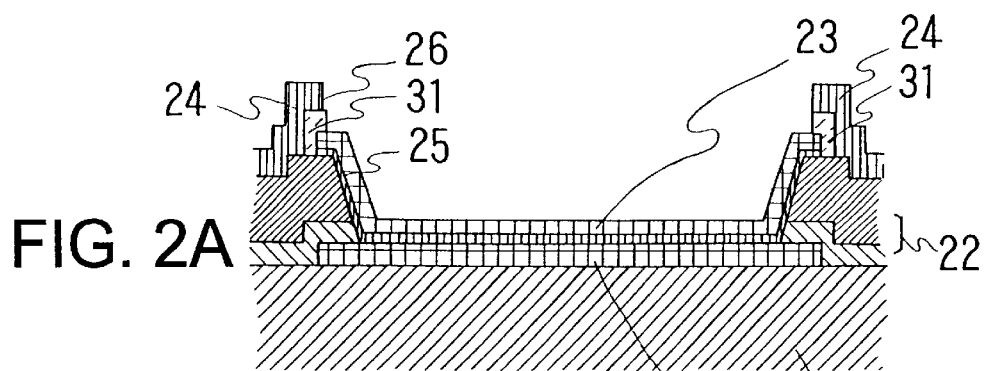
FIG. 2A
FIG. 2B

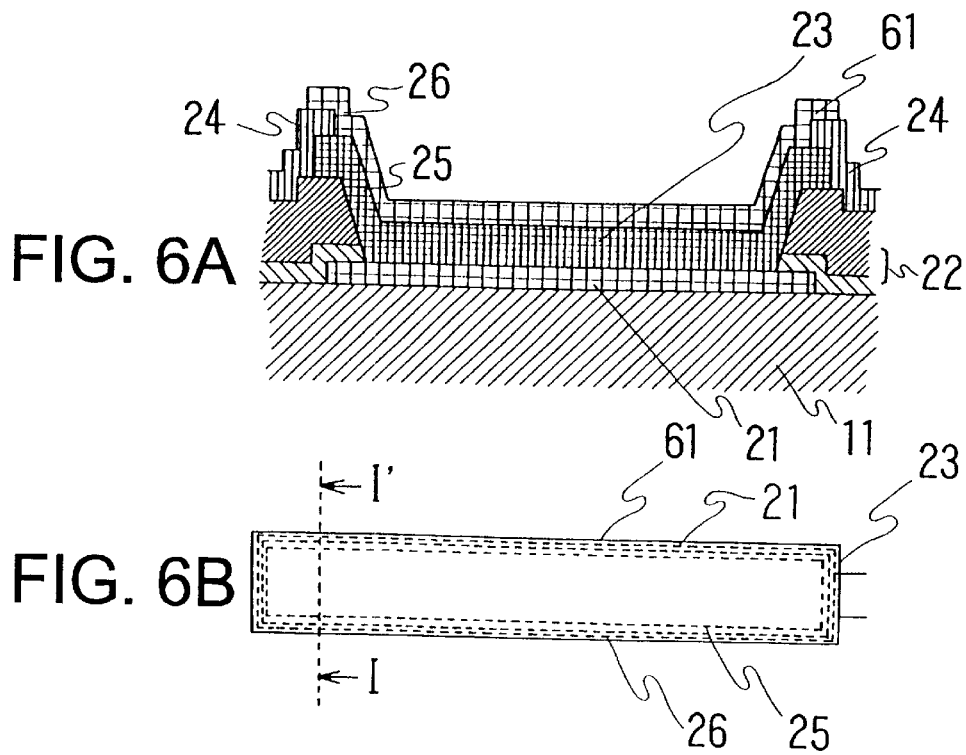
FIG. 6A
FIG. 6B
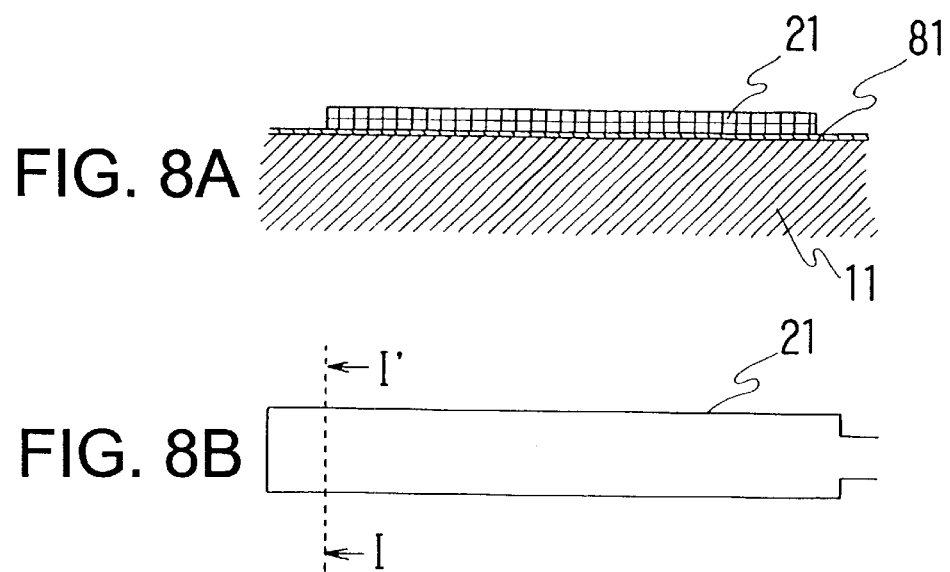
FIG. 8A
FIG. 8B

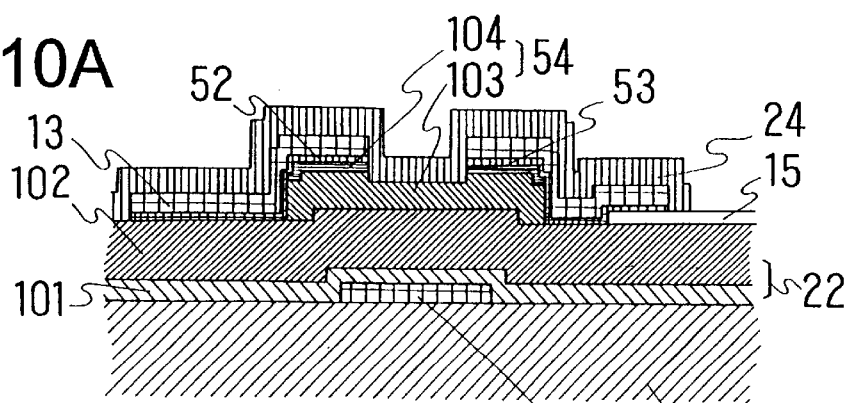
FIG. 10A
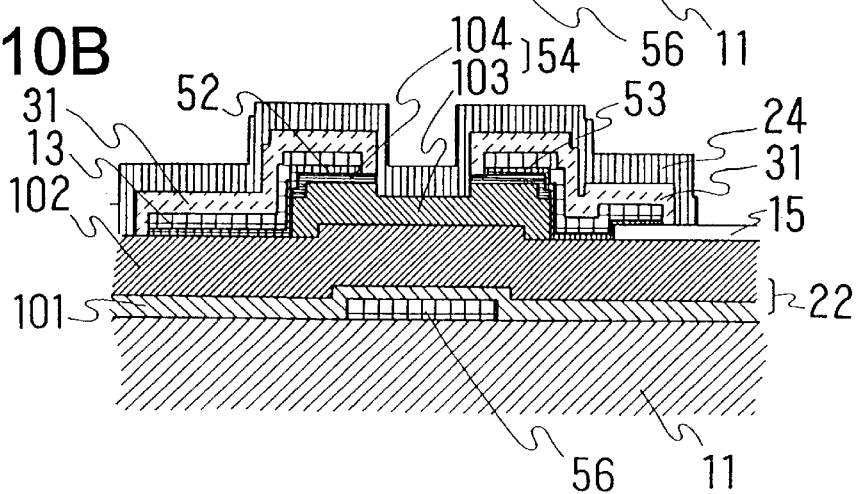
FIG. 10B
FIG. 10C
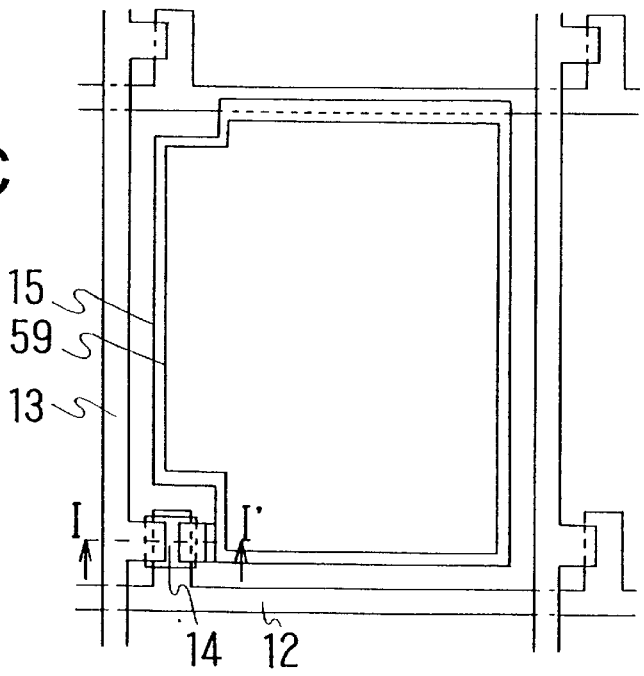

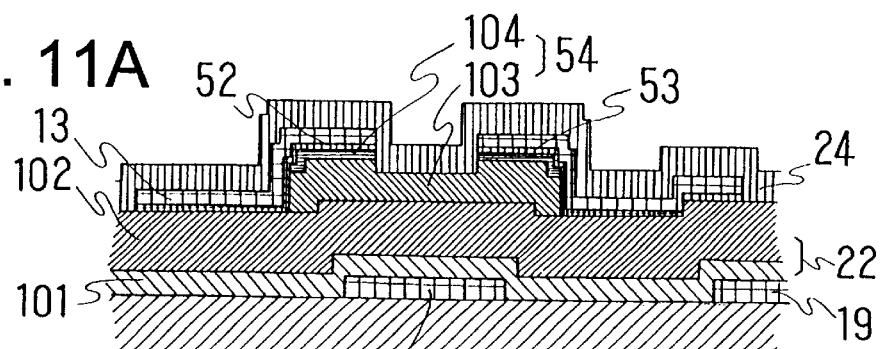
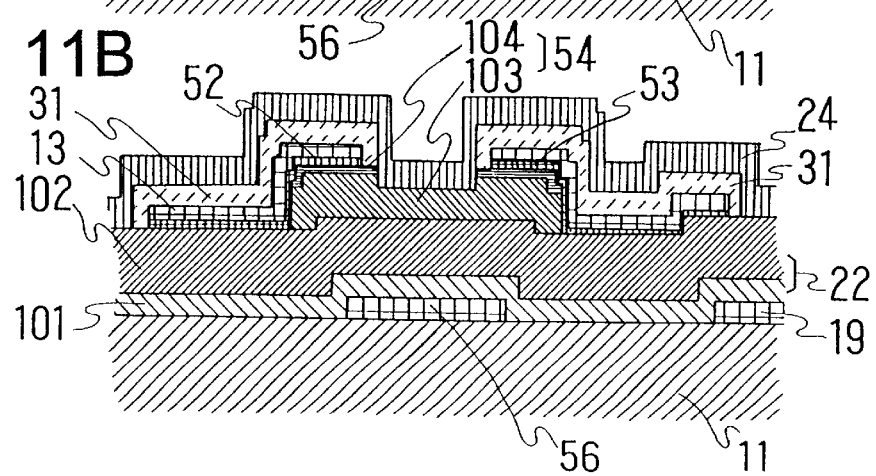
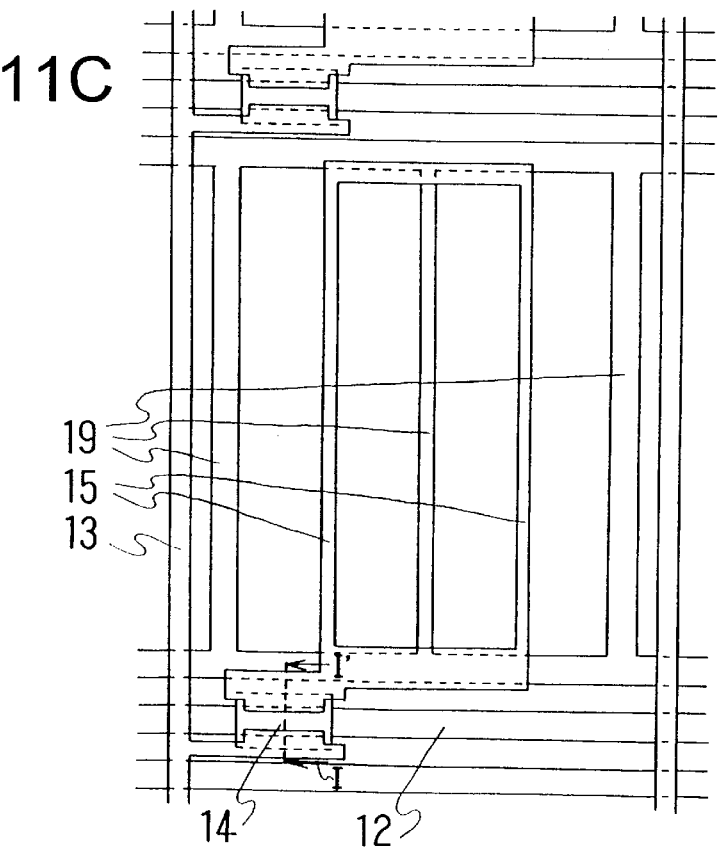

LIQUID CRYSTAL DISPLAY PANEL AND METHOD OF MANUFACTURING THE SAME, INCLUDING A STRUCTURE FOR, AND A METHOD OF PREPARING, TERMINAL OR CONNECTING ELECTRODES FOR CONNECTING LIQUID CRYSTAL DISPLAY PANEL TO AN EXTERNAL DRIVE CIRCUIT

BACKGROUND OF THE INVENTION

The present invention relates to liquid crystal display panels for liquid crystal displays and, more particularly, the structure of and method of preparing terminal or connecting electrodes for connecting such a display panel to an external drive circuit.

Up to date, liquid crystal displays which feature small thickness and light weight, particularly active matrix liquid crystal displays which have switching elements each provided for each pixel, have been extensively used. The extensive use of active matrix liquid crystal displays is attributable to their general features that they are capable of readily providing gradations, quickly responsive and suited for displaying moving images. As the switching element are used thin film transistors (TFT) and MIM elements.

FIG. 14 is a sectional view showing an active matrix liquid crystal display. The illustrated active matrix liquid crystal display comprises an active matrix substrate 1 having switching elements, another substrate 2 parallel to and spaced apart by about 50 μm from the substrate 1, and liquid crystal 4 filling a space defined by the substrates 1 and 2 and a seal 3. Polarizing sheets 5 are each bonded to the outer surface of each of the substrates 1 and 2.

FIG. 15 is a view showing the electric configuration of an active matrix liquid crystal display panel using TFTs. The illustrated active matrix liquid crystal display panel using the TFTs, comprises pluralities of scan lines 12 and signal lines 13, which are formed in crossing relation to one another on a transparent substrate 11, and the TFTs 14 provided at the intersections of the lines 12 and 13. The TFT 4 is a three-terminal element, which comprises a switching semiconductor layer and a gate, a source and a drain electrodes. Pixel electrodes 15, each connected to each TFT 14, are provided in a matrix array. For connecting the display panel to an external drive circuit, scan line terminals 16 are provided on the leading ends (i.e., one side) of the scan lines 12, and signal line terminals 17 are provided on the leading ends (i.e., one side) of the signal lines 13. The external drive circuit is usually electrically connected to the display panel by press bonding the two via a tape carrier package (TCP) and an isotropic conductive film (ACF), the TCP being provided on the circuit side, the ACF being provided on the terminal surface side.

Referring to FIG. 15, for instance, when a scan line Xi among the scan lines 12 is selected and activated by voltage pulse application, the TFTS 14 connected to this scan line are simultaneously turned on with a resultant increase of their gate voltage beyond a threshold voltage, and signal voltage corresponding to image data is transmitted from each signal line 13 through the source of each "on" TFT 14 to the drain thereof. The signal voltage transmitted to the drain produces a voltage difference between the pixel electrode 15, which is connected to the drain, and the opposed electrode 19 facing the pixel electrode 15 via the intervening liquid crystal layer 18, thus changing the light permeability thereof for image display.

In a liquid crystal display of lateral electric field type, the opposed electrode 19 is provided on the TFT substrate side. In this display, when the selected scan line Xi is restored to the non-selected state so that the gate voltage becomes lower than the threshold voltage, the gates of all the TFTs 14 connected to this scan line are turned off at a time, and then the next scan line Xi+1 is selected, and the gates of the TFTs 14 connected to this scan line are turned on, thus bringing about an operation like that described above.

After the gates have been turned off, the voltage difference between the pixel electrode 15 and the opposed electrode 19 is accumulated in the inter-electrode electrostatic capacitance and held in the liquid crystal layer 18 until the same scan line is selected and activated afresh by voltage pulse application.

In the active matrix substrate which uses amorphous silicon (a-Si) for the semiconductor layer and utilizes TFTs or MIM elements, connecting terminals (i.e., scan line terminals 16 and signal line terminals 17) are provided on the leading ends of the scan lines and signal lines for connecting the display panel to the external drive circuit. In the case of utilizing TFTs, the above operation is brought about.

Requirements for the connecting terminals are that the connection resistance at the terminal part is low and stable, that high reliability can be ensured against intrusion of water or the like from the outside and that a press bonding process can be readily carried out afresh.

By way of example, Japanese Patent Laid-Open No. 60-260920 discloses a method, in a liquid crystal display of thermal write type, of forming an aluminum hydroxide cover film on heating electrodes by using aluminum or an alloy thereof.

FIG. 17 shows the method described in the Japanese Patent Laid-Open No. 60-260920. In this method, after formation on a transparent substrate 11 of stripe-like heating electrodes 171 of aluminum or an alloy thereof, the resultant substrate is hot water treated in pure water at 50 to 100 degrees C, and then an aluminum hydroxide cover film is formed to a thickness of 0.1 to 1 μm on the surface of the heating electrodes 171. In the hot water treatment, on the terminal electrode was formed the photo resist pattern and the aluminum hydroxide is not formed thereon.

Japanese Patent Laid-Open No. 3-280021 discloses an electro-optical apparatus, which uses aluminum or like corrosion-resistant metal for the terminal electrode part. FIG. 18 shows the discloses electro-optical apparatus. As shown in the Figure, on a transparent substrate 11 are formed a pixel electrode (not shown), a non-linear resistance layer 181, an upper electrode (not shown) of chromium, a column electrode 182, a terminal electrode 184 of aluminum.

Aluminum and its alloys is usually readily subject to corrosion. However, even by directly forming the terminal electrode in this way, relatively satisfactory reliability can be maintained against external water intrusion.

As a further example, Japanese Patent Laid-Open No. 8-12282 discloses a technique concerning a thin film transistor substrate, which has scan lines and gate electrodes formed by using aluminum or an alloy thereof and covered by an anodic oxidization film. This technique features satisfactory anodic oxidization film boundary controllability with respect to the gate terminal part. FIG. 19 illustrates this technique. As shown in the Figure, on a transparent substrate 11 are formed a scan line 12, a signal line 13, a TFT 14 and a pixel electrode 15. The scan line 12 and the gate of the TFT 14 are formed by using aluminum or an alloy thereof. Scan line terminal part 16 is formed by laminating aluminum or an alloy thereof, titanium or tantalum and indium tin oxide (ITO). The scan line 12 and gate electrode are covered by an anodic oxidization film of aluminum, which is formed by an anodic oxidization process in the presence of a titanium layer having been formed.

Japanese Patent Laid-Open No. 43-232274 also discloses a method, which is used for a thin film transistor substrate using aluminum or an alloy thereof for scan lines and gate electrodes for covering these desired parts with an anodic oxidization film.

The prior art techniques disclosed in the Japanese Patent Laid-Opens No. 60-260920 and No. 3-280021, however, have a problem that an additional photo-lithographic process is necessary for the following reasons. According to the Japanese Patent Laid-Open No. 60-260920, it is necessary to carry out the hot water process by forming a photo-resist pattern on the terminal electrode part. According to the Japanese Patent Laid-Open No. 3-280021 it is necessary to convert chromium low electrodes in the terminal electrode part to aluminum.

Another problem posed in these techniques is that the electric connection between the terminal electrode part and the TCP may not be obtained or may result in high and unstable connection resistance (or forced contact resistance). This is so because in either technique an insulating layer may be formed on aluminum, as a result of possible oxidization of the aluminum surface in annealing that is carried out in the final step of an array process or orientation film sintering carried out in a cell formation process (due to highly possible exposure of the substrate at a high temperature to air for temperature reduction after the thermal process), or possible oxidization or hydroxidization of the aluminum surface in washing carried out in the cell formation process (due to highly provable rinsing with hot water or steam drying the substrate after the washing).

A further problem is possible irregular display or reduction of the yield and reliability. This is so because it is impossible to use alkali or acid in the washing carried out in the cell formation process (for the aluminum of the terminal electrode part is etched by alkali or acid), thus resulting in insufficient removal of alkali ions or acid ions so that the residual ions migrate into and remain in the liquid crystal.

A still further problem is the generation of hillocks in the aluminum of the terminal electrode part, resulting in damages to the orientation film of the element part or contamination of rubbing roll in rubbing carried out in the cell formation process. This is so because the hillocks which have been generated during the annealing in the alloy process or the orientation film sintering in the cell formation process, are squeezed and to be drown up to the element part and attached to the rubbing roll during the rubbing.

The techniques disclosed in the Japanese Patent Laid-Opens No. 8-122822 and No. 3-232274 have a problem that an additional photo-lithographic process is necessary, thus leading to a cost increase. This is so because according to the Japanese Patent Laid-Open No. 8-122822 the titanium or tantalum film in the terminal electrode part should be patterned, and according to the Japanese Patent Laid-Open No. 3-232274 the aluminum scan lines in the terminal electrode part should be converted to chromium or tantalum.

SUMMARY OF THE INVENTION

An object of the present invention is to provide a liquid crystal display panel, which can ensure low and stable resistance of forced contact of the terminal electrode part with the TCP and high connection reliability, and requires no additional process, and also a method of manufacturing the same.

According to a first aspect of the present invention, there is provided a liquid crystal display panel including an active matrix substrate, another substrate facing the active matrix substrate and liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements and connecting electrodes provided on leading end portions of the scan lines and signal lines are formed; and at least a connecting part of the connecting electrodes is formed by using aluminum or alloy mainly composed thereof.

According to a second aspect of the present invention, there is provided a liquid crystal display panel including an active matrix substrate, another substrate facing the active matrix substrate and liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements, opposite electrodes and connecting electrodes provided on leading end portions of the scan lines and signal lines are formed; and at least a connecting part of the connecting electrodes is formed by using aluminum or alloy mainly composed thereof.

According to a third aspect of the present invention, there is provided a liquid crystal display panel including an active matrix substrate, another substrate facing the active matrix substrate and liquid crystal intervening between the two substrates, wherein:

the active matrix substrate comprises a transparent substrate, on which a plurality of signal lines, switching elements provided on the signal lines, pixel electrodes connected to the switching elements and connecting electrodes provided on leading end portions of the signal lines are formed; and at least a connecting part of the connecting electrodes is formed by using aluminum or alloy mainly composed thereof.

According to a fourth aspect of the present invention, there is provided a liquid crystal display panel including an active matrix substrate, another substrate facing the active matrix substrate and liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements and connecting electrodes provided on leading end portions of the scan lines and signal lines are formed;

at least a connecting part of the connecting electrodes is formed by using aluminum or alloy mainly composed thereof; and in an active matrix substrate area with the intervening liquid crystal present therein, an insulating film covers the surfaces of uppermost layer scan lines, signal lines and electrodes of the switching elements.

According to a fifth aspect of the present invention, there is provided a liquid crystal display panel including an active matrix substrate, another substrate facing the active matrix substrate and liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements, opposite electrodes and connecting electrodes provided on leading end portions of the scan lines and signal lines are formed;

at least a connecting part of the connecting electrodes is formed by using aluminum or alloy mainly composed thereof; and in an active matrix substrate area with the intervening liquid crystal present therein, an insulating film covers the surfaces of uppermost layer scan lines, signal lines, electrodes of the switching elements and opposed electrodes.

According to a sixth aspect of the present invention, there is provided a liquid crystal display panel including an active matrix substrate, another substrate facing the active matrix substrate and liquid crystal intervening between the two substrates, wherein:

the active matrix substrate comprises a transparent substrate, on which a plurality of signal lines, a plurality of switching elements provided at the plurarity of signal lines, pixel electrodes connected to the switching elements and connecting electrodes provided on leading end portions of the signal lines are formed;

at least a connecting part of the connecting electrodes is formed by using aluminum or alloy mainly composed thereof; and portions of the signal lines in an area with the intervening liquid crystal therein are covered by an insulating film.

According to the present invention, there is provided a method of manufacturing a liquid crystal panel including an active matrix substrate, another substrate facing the active matrix substrate and liquid crystal intervening between the two substrates, comprising:

an active matrix substrate preparation step of forming a protective insulating film on connecting electrodes of aluminum or an alloy mainly composed thereof, forming the protecting insulating film with terminal contact holes reaching the connecting electrodes, and forming, in a hot water process, an insulating film consisting of a laminate film of aluminum oxide and aluminum hydroxide on connecting portions of the connecting electrodes;

the insulating film formed on the connecting portions of the connecting electrodes being selectively removed in a step subsequent to the final step in a subsequent liquid crystal display panel manufacturing process.

According to another aspect of the present invention, there is provided a method of manufacturing a liquid crystal panel including an active matrix substrate, another substrate facing the active matrix substrate and liquid crystal intervening between the two substrates, comprising:

an active matrix substrate preparation step of forming connecting electrodes of aluminum or an alloy mainly composed thereof, forming, in an anodic oxidization or hot water process, an insulating film of aluminum oxide or consisting of a laminate film of aluminum oxide and aluminum hydroxide, forming a protective insulating film on the connecting electrodes, and forming the protective insulating film with terminal contact holes reaching the insulating film formed on the connecting electrodes;

the insulating film formed on the connecting portions of the connecting electrodes being selectively removed in a step subsequent to the final step in a subsequent liquid crystal display panel manufacturing process.

According to other aspect of the present invention, there is provided a method of manufacturing a liquid crystal panel including an active matrix substrate, another substrate facing the active matrix substrate and liquid crystal intervening between the two substrates, comprising:

an active matrix substrate preparation step of forming connecting electrodes of aluminum of an alloy mainly composed thereof, and forming, by an anodic oxidization or hot water process, an insulating film of aluminum oxide or an insulating film consisting of a laminate film of aluminum oxide and aluminum hydroxide on the connecting electrodes;

the insulating film formed on the connecting portions of the connecting electrodes being selectively removed in a step subsequent to the final step in a subsequent liquid crystal panel manufacturing step.

According to further aspect of the present invention, there is provided a method of liquid crystal display comprising:

forming a terminal electrode part on an active matrix substrate of the liquid crystal display connected to an external drive circuit by using aluminum or an aluminum alloy, at least their surfaces connected to TCP are covered with an insulating film of aluminum oxide or consisting of a laminate film of aluminum oxide aluminum hydroxide; and selectively removing the insulating film in a step subsequent to the final step in a subsequent liquid crystal panel manufacturing step.

According to still further aspect of the present invention, there is provided a method of manufacturing of a liquid crystal display panel comprising steps of:

forming terminal electrodes by selectively forming a first metal film on a transparent substrate;

forming an inter-layer insulating film with a terminal contact hole reaching the first metal film;

selectively forming a second metal film, which is a single-layer film of aluminum or an alloy thereof or a laminate film including an uppermost layer of aluminum or an alloy thereof, in the terminal contact hole; and forming a protective insulating film with a terminal contact hole.

According to other aspect of the present invention, there is provided a method of manufacturing of a liquid crystal display panel comprising steps of:

forming terminal electrode by selectively forming a first metal film on a transparent substrate;

forming an inter-layer insulating film with a terminal contact hole reaching the first metal film;

selectively forming a second metal film which is a single-layer film of aluminum or an alloy thereof or a laminate film including an uppermost layer of aluminum or an alloy thereof and an insulating film which is an aluminum oxide film or a laminate film of aluminum oxide and aluminum hydroxide thereon in the terminal contact hole, and forming a protective insulating film and an insulating film with a terminal contact hole reaching the second metal film.

According to still other aspect of the present invention, there is provided a method of manufacturing of a liquid crystal display panel comprising steps of:

forming terminal electrodes by selectively forming a first metal film on a transparent substrate;

forming an inter-layer insulating film with a terminal contact hole reaching the first metal film; and selectively forming a second metal film, which is a single-layer film of aluminum or an alloy thereof or a laminate film including an uppermost layer of aluminum or an alloy thereof, in the terminal contact hole, forming an insulating film, which is an aluminum oxide film or a laminate film of aluminum oxide and aluminum hydroxide, to cover the surfaces of uppermost layer lead lines and electrodes.

In the liquid crystal display panel according to the present invention, the surfaces of connection terminals of aluminum or an alloy thereof, which are to be connected to the TCP, are once covered with an insulating film of aluminum oxide or forming by laminating aluminum oxide and aluminum hydroxide, and this insulating film is selectively etched off in the final step of the cell formation process, thus dispensing with any additional photo-lithographic process, ensuring reliable electric connection of the terminal electrode part to the TCP and improving the reliability of the electric connection.

Other objects and features will be clarified from the following description with reference to attached drawings.

BRIEF DESCRIPTION OF THE DRAWINGS

FIGS. 1(a) and 1(b) are a sectional view in a short side direction and a plan view showing the terminal electrode of active matrix substrate of liquid crystal display panel according to a first embodiment;

FIGS. 2(a) and 2(b) are a sectional view in a short side direction and a plan view showing the terminal electrode of active matrix substrate of liquid crystal display panel according to a second embodiment;

FIGS. 6(a) and 6(b) are a sectional in short side direction and a plan view showing the active matrix substrate of liquid crystal display panel according to the third embodiment;

FIGS. 8(a) and 8(b) are a sectional view in short side direction and a plan view showing a further modification of the terminal electrode part of the liquid crystal display panel according to the third embodiment;

FIGS. 10(a), 10(b) and 10(c) are sectional views and a plan view showing the switching element (MIM) of an active matrix substrate, which is formed in the application of Embodiments 1 and 2 to a liquid crystal display panel of longitudinal electric field type;

FIGS. 11(a), 11(b) and 11(c) are sectional views and a plan view showing the switching element (MIM) of an active matrix substrate, which is formed in the application of Embodiments 1 and 2 to a liquid crystal display panel of transversal electric field type;

PREFERRED EMBODIMENTS OF THE INVENTION

Figure 3A:
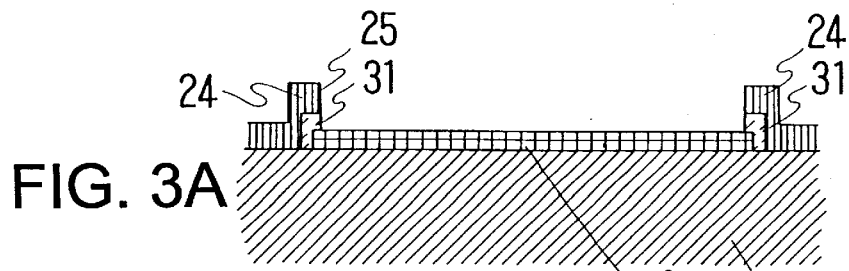
FIGS. 3(a) and 3(b) are a sectional view in short side direction and a plan view showing the terminal electrode of active matrix substrate of liquid crystal display panel according to the second embodiment.

Preferred embodiments of the present invention will now be described with reference to the drawings.

(Mode 1)

FIG. 1(a) is a sectional view taken along line I–I' in FIG. 1(b), i.e., in a short side direction, showing a terminal electrode part of a liquid crystal display panel concerning Mode 1 of the present invention. FIG. 1(b) is a plan view showing the same liquid crystal display panel.

Referring to these Figures, in the liquid crystal display panel concerning Mode 1 of the present invention, terminal electrodes are each formed by selectively forming a metal film 21 on a transparent substrate 11, forming an inter-layer insulating film 22 with a terminal contact hole 25 reaching the metal film 21, selectively forming a metal film 23 in the terminal contact hole 25, and forming a protective insulating film 24 with a terminal contact hole 26. The metal film 23 is a single-layer film of aluminum or an alloy thereof or a laminate film including an uppermost layer of aluminum or an alloy thereof.

With the liquid crystal display panel concerning Mode 1 of the present invention as shown in FIGS. 1(a) and 1(b), the insulating film of aluminum oxide or aluminum hydroxide may be formed on and removed from the terminal electrode part without need of any photo-mask, and it is thus possible to reduce the number of steps.

(Mode 2)

FIG. 2(a) is a sectional view taken along line I–I' in FIG. 2(b), i.e., in a short side direction, showing a terminal electrode part of a liquid crystal display panel in Mode 2 of the present invention. FIG. 2(b) is a plan view showing the same liquid crystal display panel.

Referring to these Figures, in the liquid crystal display panel concerning Mode 1 of the present invention, terminal electrode are each formed by selectively forming a metal film 21 on a transparent substrate 11, forming an inter-layer insulating film 22 with a terminal contact hole 25 reaching the metal film 21, selectively forming a metal film 23 and an insulating film 31 thereon in the terminal contact hole 25, and forming a protective insulating film 24 and an insulating film 32 with a terminal contact hole 26 reaching the metal film 23. The metal film 23 is a single-layer film of aluminum or an alloy thereof or a laminate film including an uppermost layer of aluminum or an alloy thereof. The insulating film 31 is an aluminum oxide film or a laminate film of aluminum oxide and aluminum hydroxide.

In the above Modes 1 and 2 the metal film 21 is provided, but it is possible to dispense with the metal film 21 and form the terminal electrodes with the sole metal film 23.

(Mode 3)

Figure 4A:
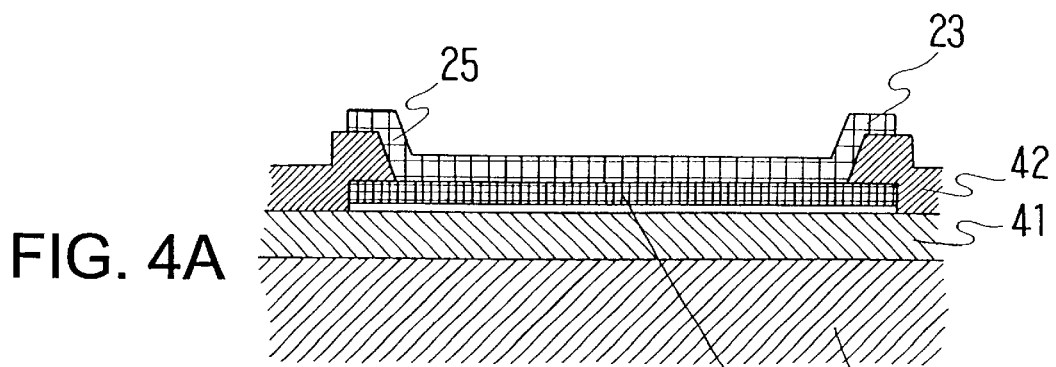
FIGS. 4(a) and 4(b) are a sectional view in a short side direction and a plan view showing the terminal electrode of active matrix substrate of liquid crystal display panel according to a third embodiment.
Figure 4B:
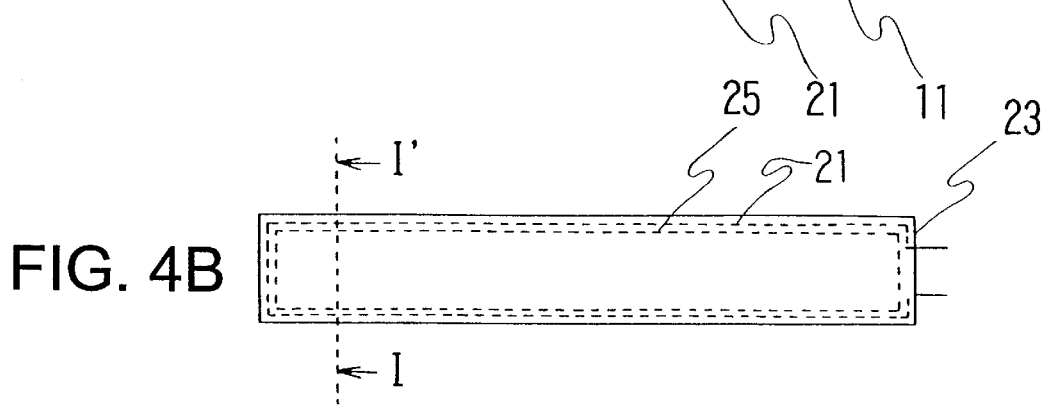
Figure 5A:
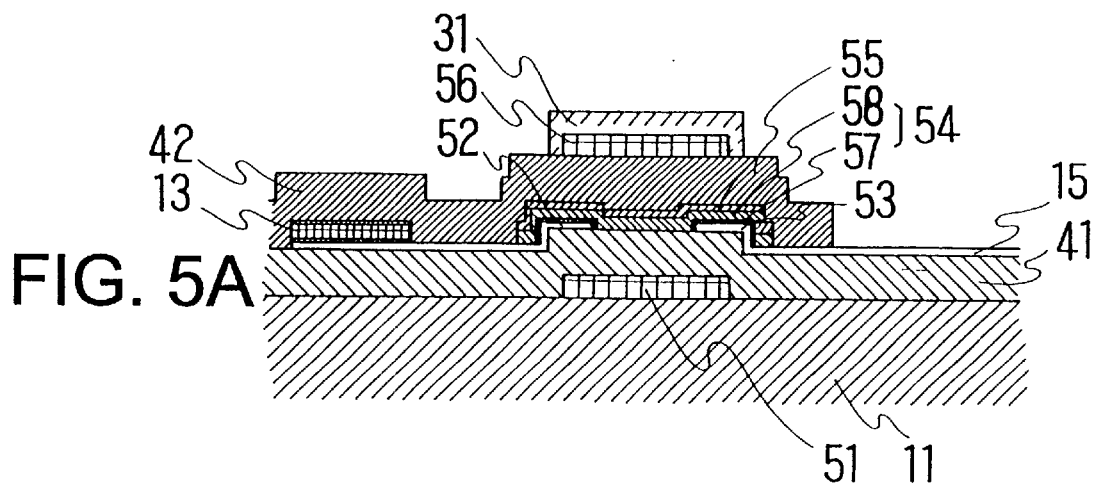
FIGS. 5(a) and 5(b) are a sectional and a plan view showing a switching element (TFT) in one-pixel part of the liquid crystal display panel according the third embodiment.
Figure 5B:
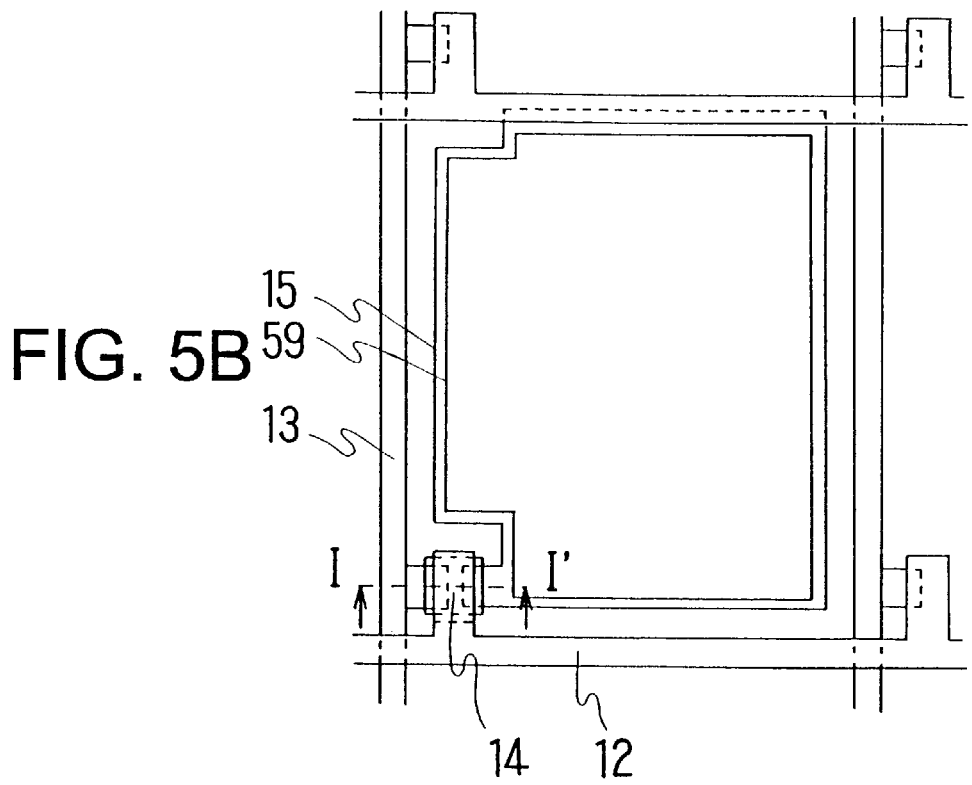

15 FIGS. 4(a), 4(b), 5(a) and 5(b) show a liquid crystal display panel concerning Mode 3 of the present invention. FIG. 4(a) is a sectional view taken along line I–I' in FIG. 4(b), i.e., in a short side direction, showing a terminal electrode part of the liquid crystal display panel concerning Mode 3 of the present invention. FIG. 4(b) is a plan view showing the same liquid crystal display panel. FIG. 5(a) is a sectional view taken along line I–I' in FIG. 5(b) showing a switching element (TFT) in one-pixel part of the liquid crystal display panel concerning Mode 3 of the present invention. FIG. 5(b) is a plan view showing the same liquid crystal display panel.

Referring to these Figures, in the liquid crystal display panel concerning Mode 3 of the present invention, terminal electrodes are each formed by selectively forming a metal film 21 on a transparent substrate 11, forming an inter-layer insulating film 22 with a terminal contact hole 25 reaching the metal film 21, and selectively forming metal film 23 in the terminal contact hole 25.

The metal film 23 is a single-layer film of aluminum or an alloy thereof or a laminate film including an uppermost layer of aluminum or an alloy thereof. In an active matrix substrate area in which the intervening liquid crystal is present, an insulating film 31 is formed to cover the surfaces of uppermost layer lead lines and electrodes. The insulating film 31 is an aluminum oxide film or a laminate film of aluminum oxide and aluminum hydroxide.

(Embodiment 1)

A specific example of the liquid crystal display panel concerning Mode 1 of the present invention will now be described as Embodiment 1.

FIGS. 1(a) and 1(b) show Embodiment 1 Of the liquid crystal display panel according to the present invention. The display panel comprises an active matrix substrate 1, another substrate 2 facing the substrate 1, and liquid crystal 4 intervening between the substrates 1 and 2. The active matrix substrate 1 has TFTs as switching elements. This structure is the same as the structure of the liquid crystal display panel shown in FIG. 14.

Referring to FIGS. 1(a) and 1(b), in Embodiment 1 the liquid crystal display panel according to the present invention, terminal electrodes are each formed by selectively forming a metal film 21 of an aluminum/neodymium alloy about 200 nm thick on a transparent substrate 11 about 0.7 mm thick of glass, forming an inter-layer insulating film (i.e., gate insulating film) 22, which consists of a laminate layer a low-temperature silicon oxide layer about 150 nm thick formed by sputtering and a low-temperature silicon nitride about 350 nm thick formed by plasma chemical gas phase growth, with a terminal contact hole 25 reaching the metal film 21, selectively forming a metal film 23, which consists of a laminate layer of a molybdenum layer about 50 nm thick and an aluminum/niodium alloy layer about 200 nm thick, in the terminal contact hole 25, and forming a protective insulating film 24 of low-temperature silicon nitride about 200 nm thick, for instance formed by plasma chemical gas phase growth, with terminal contact hole 26 reaching the metal film 23.

(Embodiment 2)

Referring to FIGS. 2(a) and 2(b), in Embodiment 2 the liquid crystal display panel according to the present invention, terminal electrodes are each formed by selectively forming a metal film 21 of an aluminum/neodymium alloy about 200 nm thick on a transparent substrate 11 about 0.7 mm thick of glass, forming an inter-layer insulating film (i.e., gate insulating film) 22, which consists of a laminate layer a low-temperature silicon oxide layer about 150 nm thick formed by sputtering and a low-temperature silicon nitride about 350 nm thick formed by plasma chemical gas phase growth, with a terminal contact hole 25 reaching the metal film 21, selectively forming a metal film 23, which consists of a laminate layer of a molybdenum layer about 50 nm thick and an aluminum/niodium alloy layer about 200 nm thick, and an insulating film 31 about 200 nm thick of tantalum oxide and aluminum oxide in the terminal contact hole 25, and forming the insulating film 31 on the metal film 23 and a protective insulating film 24 about 200 nm thick of low-temperature silicon nitride, for instance formed by plasma chemical gas phase growth, with a terminal contact hole 26 reaching the metal film 23.

Embodiments 1 and 2 shown in FIGS. 1(a) and 1(b) and 2(a) and 2(b), are examples of terminal electrode on an active matrix substrate, which uses TFTs of an inverse stagger structure as switching elements. In these examples, the scan line terminals 16 connect the scan lines 12 on the transparent substrate 11 directly to the metal film 21, and the signal line terminals 17 connect the signal lines 3 on the inter-layer insulating film (i.e., gate insulating film) 22 to the metal film 21 via separate contact holes (not shown).

FIGS. 10(a) to 10(c) show a one-pixel part of an active matrix substrate, which is formed in the application of Embodiments 1 and 2 shown in FIGS. 1(a), 1(b), and 2(a), 2(b) according to the present invention to a liquid crystal display panel of longitudinal electric field type. FIG. 10(a) is a sectional view taken along line I–I' in FIG. 10(c), showing the one-pixel part of the active matrix substrate in the application of Embodiment 1 shown in FIGS. 1(a) and 1(b). FIG. 10(b) is a sectional view taken along line I–I' in FIG. 10(c), showing the one-pixel part of the active matrix substrate in the application of Embodiment 2 shown in FIGS. 2(a) and 2(B).

FIGS. 10(a) to 10(c) show an example of channel etch type TFT.

Referring to FIGS. 10(a) and 10(b), a TFT 14 of bottom gate type is shown, which is formed on a transparent substrate 11 having 0.7 nm thick of glass and comprises, from the lower layer side, a gate electrode 56 about 200 nm thick from aluminum/niodium alloy, an inter-layer insulating film (gate insulating film) 22 formed as a lamination of a first gate insulating film 101 having 159 nm thick of low-temperature silicon oxide formed by sputtering and a second gate insulating film 102 about 350 nm thick of low-temperature silicon nitride formed by plasma chemical gas phase grow, an island semiconductor layer 54 having 350 nm thick of amorphous silicon facing the gate electrode 56 via the inter-layer insulating film 22, a source and a drain electrode 52 and 53 formed in opposite side spaced-apart portions of the island semiconductor layer 54 as a laminate film consisting of a molybdenum film (Embodiment 1) or a tantalum nitride film (Embodiment 2) about 50 nm and an aluminum/neodymium alloy film about 20 nm thick.

The gate electrode 56 is connected to a scan line 12 also about 200 nm thick of aluminum/neodymium alloy. The source electrode 52 is connected to a signal line 13 also formed as a laminate film consisting of a molybdenum film (Embodiment 1) or a tantalum nitride film (Embodiment 2) about 50 nm thick and an aluminum/neodymium alloy film about 200 nm thick. The drain electrode 53 is connected to a pixel electrode 15 about 100 nm of ITO.

In Embodiment 2 shown in FIG. 10(b), an insulating film 31 about 200 nm thick of tantalum oxide and aluminum oxide, covers the source and drain electrodes 52 and 53 and the signal line 13. A semiconductor layer 54 is formed as a laminate film consisting of a first semiconductor thin film 103 about 300 nm thick of amorphous silicon not doped with any impurity and an n-type second semiconductor thin film 104 about 50 nm thick of amorphous silicon not doped with phosphorus. The second semiconductor thin film 104 is formed as separate portions on on the source and drain electrodes 52 and 53.

FIGS. 11(a) and 11(b) show a one-pixel part of an active matrix substrate, which is formed in applications of Embodiments 1 and 2 shown in FIGS. 1(a), 1(b) and 2(a), 2(b) to a liquid crystal display panel of a transversal electric field type. FIG. 11(a) is a sectional view taken along line I–I' in FIG. 11(c), showing the one-pixel part of the active matrix substrate in the application of Embodiment shown in FIGS. 1(a) and 1(b) to the liquid crystal display panel of transversal electric field type. FIG. 11(b) is a sectional view taken along line I–I' shown in FIG. 11(c), showing the one-pixel part of the active matrix substrate in the application of Embodiment 2 shown in FIGS. 2(a) and 2(b) to the liquid crystal display panel of transversal electric field type.

In the liquid crystal display panels of longitudinal electric field type shown in FIGS. 10(a) and 10(b) the opposed electrode is formed on the other substrate side, while in the liquid crystal display panels of transversal electric field type shown in FIGS. 11(a) and 11(b), the opposed electrode is formed on the active matrix substrate type. The pixel electrode and the opposed electrode have comb-like shapes. However, the TFT has the same structure in both types.

Referring to FIGS. 11(a) and 11(b), a TFT 14 of bottom gate type is shown, which is formed on a transparent substrate 11 having 0.7 nm thick of glass and comprises, from the lower layer side, a gate electrode 56 about 200 nm thick from aluminum/niodium alloy, an inter-layer insuating film (gate insulating film) 22 formed as a lamination of a first gate insulating film 101 having 159 nm thick of low-temperature silicon oxide formed by sputtering and a second gate insulating film 102 about 350 nm thick of low-temperature silicon nitride formed by plasma chemical gas phase grow, an island semiconductor layer 54 having 350 nm thick of amorphous silicon facing the gate electrode 56 via the inter-layer insulating film 22, a source and a drain electrode 52 and 53 formed in opposite side spaced-apart portions of the island semiconductor layer 54 as a laminate film consisting of a molybdenum film (Embodiment 1) or a tantalum nitride film (Embodiment 2) about 50 nm and an aluminum/neodymium alloy film about 20 nm thick.

A gate electrode 56 is connected to a scan line 12 also about 200 nm thick of aluminum/neodymium alloy. A source and a drain electrode 52 and 53 are connected to a signal line 13, which is also formed as a laminate film of a molybdenum film (Embodiment 1) or a tantalum nitride film (Embodiment 2) about 50 nm thick and an aluminum/neodymium alloy film about 200 nm thick, and to a pixel electrode 15, respectively. The opposed electrode 19 is formed from the same layer as the gate electrode 56, i.e., layer about 200 nm thick of aluminum/neodymium alloy, such that it faces the pixel electrode 15.

In Embodiment 2 shown in FIG. 11(b), the source and drain electrodes 52, 53, the signal line 13 and the pixel electrode 15 are covered by the insulating film 31 having the tantalum oxide of about 200 nm and the aluminum oxide. The structure of semiconductor layer 54 is the same as that of Embodiment 1 shown in FIG. 10.

A method of manufacturing the embodiments of the liquid crystal display panels of longitudinal electric field type as shown in FIGS. 10(a) to 10(c), will now be described.

The gate electrode 56, the scan line 12 and the metal film 21 of the terminal part are first formed by forming an aluminum/neodymium alloy film about 200 nm thick by sputtering on the transparent substrate 11 having 0.7 mm thick of glass and photolithographically patterning the film. Then, the gate insulating film 101 is formed by high frequency sputtering low-temperature silicon oxide to a thickness of, for instance, about 150 nm.

Then, the island semiconductor layer 54 as the laminate consisting of the intrinsic first semiconductor thin film 103 and the n-type second semiconductor thin film 104, is formed by successively forming, by plasma chemical gas phase growth, a low-temperature silicon nitride film about 350 nm thick, an amorphous silicon film about 300 nm thick free from doped impurity and an amorphous silicon film 50 nm thick doped with phosphorus and photolithographically patterning the films.

Then, the pixel electrode 15 is formed by sputtering ITO to a thickness of about 100 nm lithographically patterning the film thus formed.

Then, the contact hole 25 is lithographically formed over the metal film 21 of the terminal electrode part.

Then, the source and drain electrodes 52 and 53, the signal line 13 and the metal film 23 of the terminal electrode part, are formed by successively sputtering forming, in Embodiment 2 a molybdenum film about 50 nm thick and an aluminum/neodymium alloy film about 200 nm thick, and in Embodiment 2 a tantalum nitride film about 50 nm thick and an aluminum/neodymium alloy about 300 nm thick, and hotographically patterning these films.

In Embodiment 2, the source and drain electrodes 52 and 53, the signal line 13 and the metal film 23 of the terminal electrode part are covered by the insulating film 31 about 200 nm thick of tantalum and aluminum by anodically oxidizing them in, for instance, a blend solution containing 1:9 of a solution obtained by neutralizing 3% tartaric acid with ammonia water and ethylene glycol. The anodic oxidization is carried out by applying gradually increasing DC voltage to an anodic oxidization terminal such as to finally obtain a constant current of about 2 mA/cm$^2$ and finally holding a constant voltage of about 120 V for about 15 minutes.

Subsequently, the n-type second semiconductor thin film 104 is etchedly patterned for channel formation by using the source and drain electrodes 52 and 53 as a mask.

Then, the protective insulating film 24, for instance about 200 nm thick, of low-temperature silicon nitride is formed by plasma chemical gas phase growth, and is then photolithographically formed with the hole 59 over the pixel electrode 15 and the terminal contact hole 26 over the metal film 23 of the terminal electrode part.

In Embodiment 1, the insulating film 31 as the laminate film consisting of an aluminum hydroxide film (upper layer) about 100 nm thick and an aluminum oxide film (lower layer) about 50 nm thick, is formed on the aluminum/neodymium alloy connecting part surface of the metal film 23 by carrying out, for instance, a hot water treatment at 70 degrees C for about 10 minutes. Finally, an annealing process is carried out to complete the substrate with the TFTs.

Afterwards, the substrate with the TFTs and the other substrate are subjected to orientation film printing and sintering, and then to rubbing. Then, the two substrates are held to define a space between them, and the space is filled with liquid crystal. Then in the final step of the cell formation process, the insulating film 31 of the connecting parts of the terminal electrodes are selectively etched off, thus completing the liquid crystal display panel.

Now, a method of manufacturing the embodiments of the liquid crystal display panels of transversal electric field type as shown in FIGS. 11(a) and 11(b) will be described.

The gate electrode 56, the scan line 12, the opposed electrode 19 and the metal film 21 of the terminal part are first formed by forming an aluminum/neodymium alloy film about 200 nm thick by sputtering on the transparent substrate 11 having 0.7 mm thick of glass and photolithographically patterning the film. Then, a first gate insulating film 101 is formed by high frequency sputtering low-temperature silicon oxide to a thickness of, for instance, about 150 nm.

Then, the island semiconductor layer 54 as the laminate consisting of the intrinsic first semiconductor thin film 103 and the n-type second semiconductor thin film 104, is formed by successively forming, by plasma chemical gas phase growth, a low-temperature silicon nitride film about 350 nm thick, an amorphous silicon film about 300 nm thick free from doped impurity and an amorphous silicon film 50 nm thick doped with phosphorus and photolithographically patterning the films.

Then, the contact hole 25 is lithographically formed over the metal film 21 of the terminal electrode part.

Then, the source and drain electrodes 52 and 53, the signal line 13, the pixel electrode 15 and the metal film 23 of the terminal electrode part, are formed by successively sputtering forming in Embodiment 1 a molybdenum film about 50 nm thick and an aluminum/neodymium alloy film about 200 nm thick, and in Embodiment 2 a tantalum nitride film about 50 nm thick and an aluminum/neodymium alloy about 300 nm thick, and photographically patterning these films.

In Embodiment 2, the source and drain electrodes 52 and 53, the signal line 13, the pixel electrode 15 and the metal film 23 of the terminal electrode part are covered by the insulating film 31 about 200 nm thick of tantalum and aluminum by the anodically oxidizing as described above.

Subsequently, the n-type second semiconductor thin film 104 is etchedly patterned for channel formation by using the source and drain electrodes 52 and 53 as a mask.

Then, the protective insulating film 24, for instance about 200 nm thick, of low-temperature silicon nitride is formed by plasma chemical gas phase growth, and the terminal contact hole 26 over the metal film 23 of the terminal electrode part is then photolithographically formed.

In Embodiment 1, the insulating film 31 as the laminate film consisting of an aluminum hydroxide film (upper layer) about 100 nm thick and an aluminum oxide film (lower layer) about 50 nm thick, is formed on the aluminum/neodymium alloy connecting part surface of the metal film 23 by carrying out the foregoing hot water treatment. Finally, an annealing process is carried out to complete the substrate with the TFTs.

Afterwards, like the above case the liquid crystal cells are formed, and in the final step of the cell formation process, the insulating film 31 of the connecting parts of the terminal electrodes are selectively etched off, thus completing the liquid crystal display panel.

(Embodiment 3)

Figure 3B:
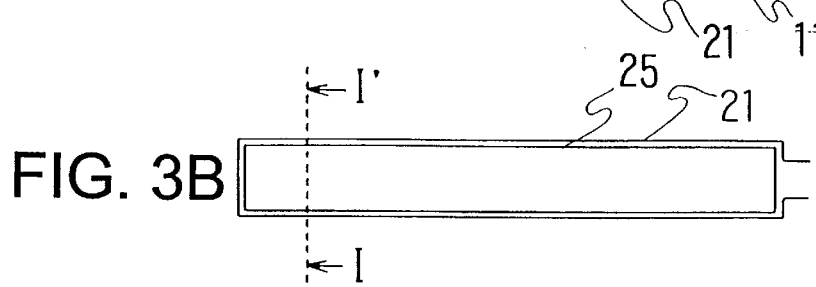

FIG. 3(a) is a sectional view taken along line I–I' in FIG. 3(a), i.e., in short side direction, a terminal electrode part of a modification (i.e., Embodiment 3) of Embodiment 2 of the liquid crystal display panel according to the present invention. FIG. 3(b) is a plan view showing the same display panel.

Figure 14:
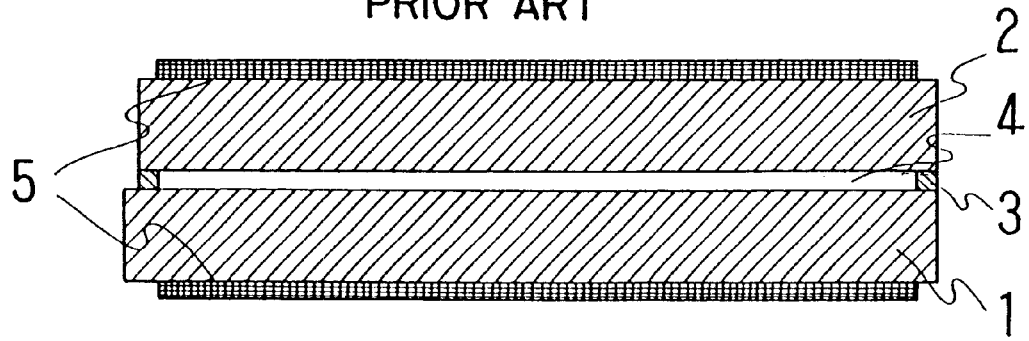
FIG. 14 is a sectional view showing the liquid crystal display panel.
Figure 15:
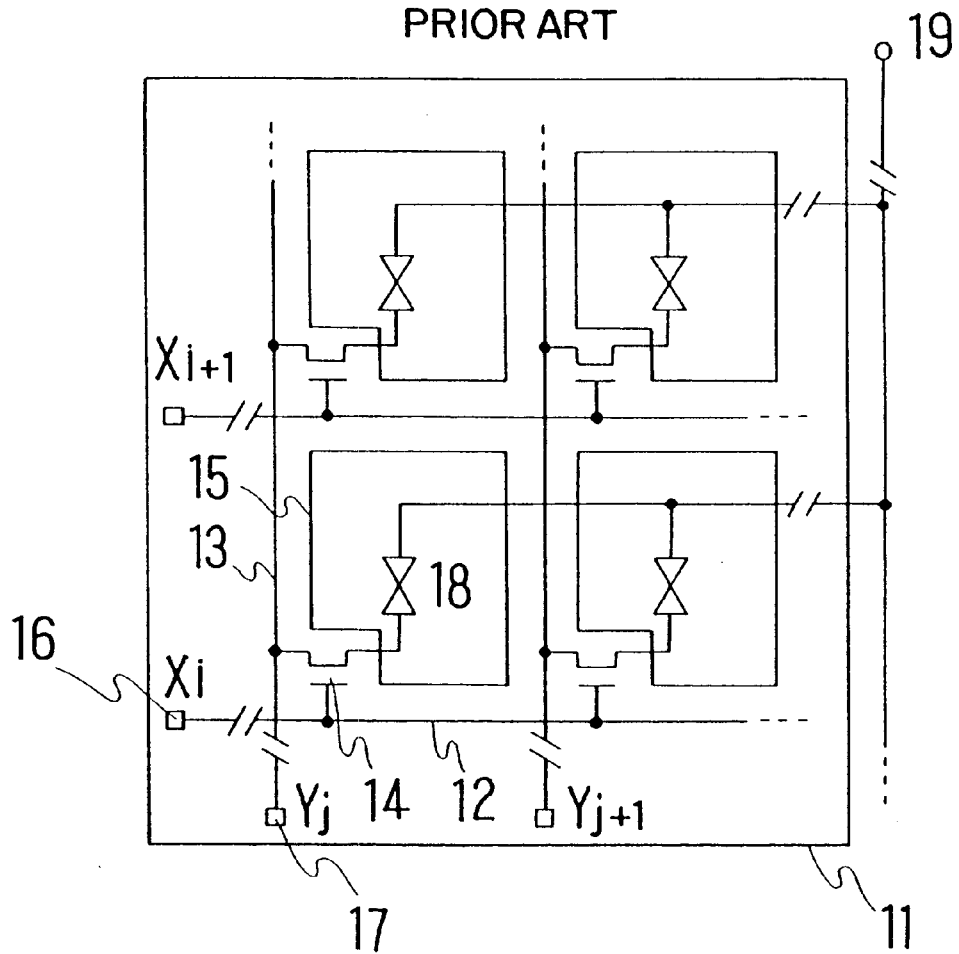
FIG. 15 is a view showing the electric configuration of an active matrix liquid crystal display panel using TFTS.

Embodiment 3 of the liquid crystal display panel shown in FIGS. 3(a) and 3(b) according to the present invention, as shown in FIG. 14, comprises an active matrix substrate 1, another substrate 2 and liquid crystal 4 intervening between the two substrates 1 and 2. The active matrix substrate 1 uses MIMs as switching elements.

In Embodiment 3 of the liquid crystal display panel according to the present invention, terminal electrodes are each formed by selectively forming, on a transparent substrate 11 having 0.7 mm thick of glass, an aluminum oxide film 23 about 200 nm thick of aluminum/tantalum alloy and an insulating film 31 about 200 nm thick of aluminum oxide covering the metal film 23, and forming the insulating film 31 on the metal film 23 and an insulating film 24 about 200 nm thick of low-temperature silicon nitride, formed by plasma chemical gas phase growth, with a terminal contact hole 2 reaching the metal film 23. In this embodiment, a signal line terminal 17 is such that the signal line 13 is directly connected to the metal film 23.

Figure 12A:
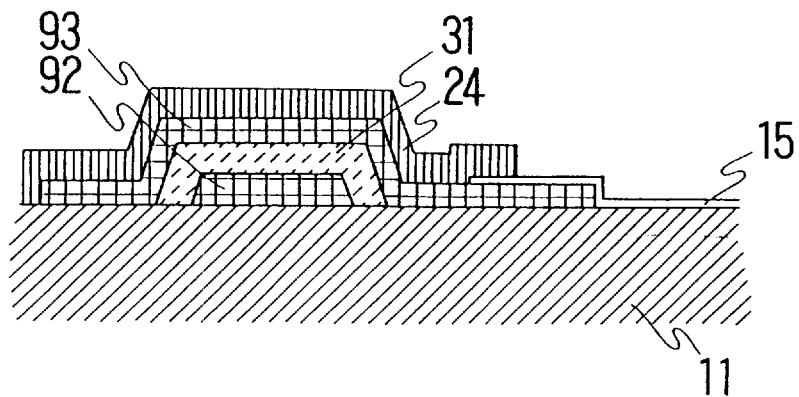
FIGS. 12(a) and 12(b) are sectional views and a plan view showing other modification of the switching element (MIM) of an active matrix substrate according to the second embodiment.
Figure 12B:
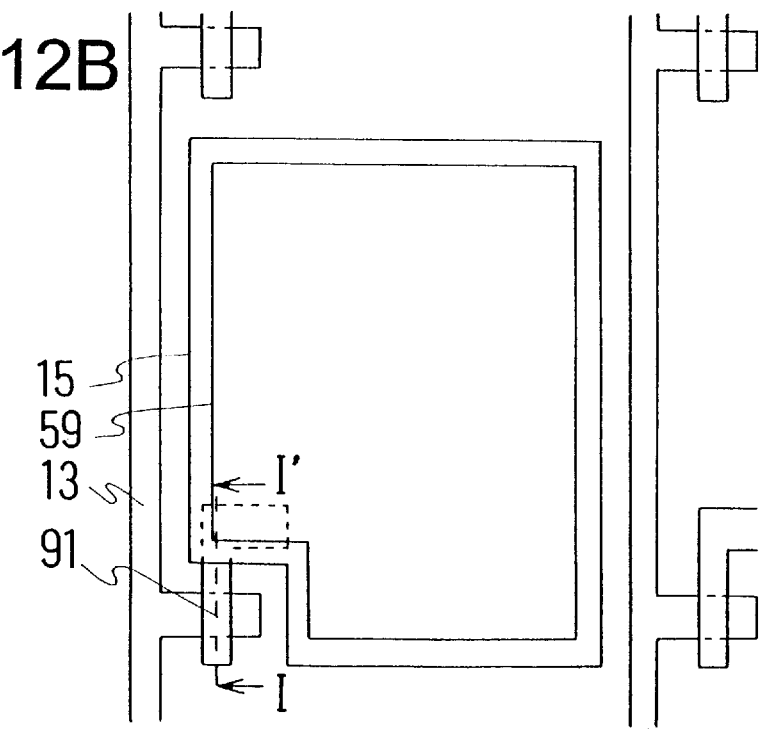

FIG. 12(b) is a sectional view taken along line I–I', showing a switching element (MIM) part in a one-pixel part of an active matrix substrate of Embodiment 3 of the liquid crystal display panel. FIG. 12(b) is a plan view showing the same one-pixel part.

An MIM 91 is shown, which is formed on the transparent substrate 11 having 0.7 mm thick of glass, which comprises a lower electrode 92 about 20 nm thick of aluminum/tantalum alloy, an insulating film 31 about 200 nm thick of aluminum oxide covering the lower electrode 92 and an upper electrode 13 about 150 nm thick of chromium. A protective insulating film 24 about 200 nm thick of low-temperature silicon nitride formed by plasma chemical gas phase growth, covers the MIM 91.

The lower electrode 92 is connected to a signal line 13 also about 200 nm thick of aluminum/tantalum alloy, and an upper electrode 93 is connected to a pixel electrode 15 about 50 nm thick of ITO. The protective insulating film 24 has an opening over the pixel electrode 15. The scan line (i.e., scan electrode) is formed on the other side.

A method of manufacturing Embodiment 3 will now be described. First, an aluminum/tantalum alloy is sputtering formed to a thickness of about 300 nm on the transparent substrate 11 0.7 nm thick of glass and lithographically patterned to form the lower electrode 92 and the signal line 13.

Then, as in the above case, the insulating film 31 about 200 nm thick of aluminum oxide is formed anodically oxidizing the surfaces of the lower electrode 92 and the signal line 13 in an oxidizing solution mainly composed of tartaric acid, and then the upper electrode 13 is formed by sputtering forming a chromium film about 150 nm thick and lithographically patterning the film.

Then, the pixel electrode 15 is formed by sputtering forming ITO about 50 nm thick and lithogrphically forming the film thus formed.

Then, the protective insulating film 24 about 200 nm thick of low-temperature silicon nitride is formed by plasma chemical gas phase growth, and is then photo-lithographically formed with a hole 59 over the pixel electrode 15 and a terminal contact hole 26 over the metal film 23 of the terminal electrode part.

Finally, annealing is executed to complete the substrate with the MIMs. Afterwards, the substrate with the MIMs and the other substrate are subjected to orientation film printing and sintering, and then to rubbing. Then, the two substrates are held to define a space between them, and the space is filled with liquid crystal. In the final step of the cell formation process, the insulating film 31 on the connecting parts of the terminal electrodes are selectively etched off, thus completing the liquid crystal display panel.

As shown above, in Embodiment 3 the insulating film of aluminum oxide or as the laminate film consisting of aluminum oxide and aluminum hydroxide is formed on at least the connecting surface of the connecting terminal part and, in the final step of the cell formation process, is selectively removed. It is thus possible to eliminate adverse effects of aluminum oxidization on the connecting terminal surface in the thermal processes (such as annealing in the array formation process and orientation film sintering in the cell formation process) and in the washing process, and thus obtain a low and stable initial forced contact resistance of the thermal electrode part.

FIG. 4(a) is a sectional view taken along line I–I', i.e., in short side direction, showing a terminal electrode part of Embodiment of the liquid crystal display panel according to the present invention. FIG. 4(b) is a plan view showing the terminal electrode part. FIG. 5(a) is a sectional view taken along line I–I', a switching element (TFT) part of a one-pixel part of the active matrix substrate of the same panel. FIG. 5(b) is a plan view showing the same one-pixel part.

Embodiment 3 of the liquid crystal display panel, as shown in FIG. 14, comprises an active matrix substrate 1, another substrate 2 and liquid crystal intervening between the substrates 1 and 2.

This embodiment is an example of the liquid crystal display panel of longitudinal electric field type with the opposed electrodes formed on the other substrate side. Referring to FIGS. 4(a) and 4(b), terminal electrodes are each formed by selectively forming, on a laminate inter-layer insulating film 41 about 300 nm thick of low-temperature silicon oxide, formed by normal pressure chemical gas phase growth on the transparent substrate 11 0.7 mm thick of glass, a metal film 21 as the laminate film of an ITO film about 50 nm in thickness and a molybdenum film about 150 nm thick, forming a second gate insulating film 42, for instance about 300 nm thick of low-temperature silicon nitride formed by plasma chemical gas phase growth, with a terminal contact hole 25 reaching the metal film 21, and selectively forming a metal film 23 of aluminum/tantalum alloy about 200 nm thick in the terminal contact hole 25.

In the TFT part shown in FIG. 5(a), on the transparent substrate 11 0.7 mm thick of glass, are succesively formed a light-blocking film 51 about 150 nm thick of molybdenum, and an inter-layer insulating film 41 about 300 nm thick of low-temperature silicon oxide formed by normal pressure chemical gas phase growth. A TFT 14 of top gate type is formed on the inter-layer insulating film 41 such that it faces the light-blocking film 51.

The TFT 14 is formed by successively laminating a source and a drain electrode 52 and 53 about 50 nm thick of ITO, a laminate film consisting of an island semiconductor layer 54 50 nm thick of amorphous silicon, formed on the source and drain electrodes 52 and 53, and a first gate insulating film 55 about 50 nm thick of low-temperature silicon nitride, formed by plasma chemical gas phase growth, a second gate insulating film 42 about 300 nm thick of low-temperature silicon nitride, formed by plasma chemical gas phase growth, and a gate electrode 56 about 200 nm thick of an aluminum/titanium/tantalum alloy, facing the island semiconductor layer 54 via the gate insulating films 55 and 42.

The gate electrode 56 is connected to a scan line 12 also of the aluminum/titanium/tantalum alloy, the source electrode 52 is connected to a signal line 13 as a laminate film consisting of an ITO film about 50 nm thick and a molybdenum film about 150 nm thick, and the drain electrode 53 is connected to a pixel electrode 15 also of the ITO.

An insulating film 31, which is formed as an aluminum oxide film about 200 nm thick or a laminate film consisting of an aluminum hydroxide film about 150 nm thick and an aluminum oxide film about 100 nm thick, covers the scan line 12 and the gate electrode 56.

The island semiconductor layer 54 is formed by laminating an n-type first semiconductor thin film 57 about 5 nm of phosphorus-doped amorphous silicon, which is formed as separate portions on the sides of the source and drain electrodes 52 and 53, and a second semiconductor thin film 58 about 45 nm of non-impurity-containing amorphous silicon.

Embodiment 3 is an example of an active matrix substrate using TFTs having a forward stagger structure as switching elements. In this structure, the signal line terminal 17 is connected by the signal line 13 directed by the signal line formed on the transparent substrate 11 to the metal film 21 of the terminal electrode part, and the scan line terminal 16 is connected by the scan line formed the second gate insulating film 42 to the metal film 21 in a separate contact hole (131 in FIG. 13(a)).

A method of manufacturing Embodiment 3 will now be described with reference to FIGS. 13(a) to 13(b). The light-blocking film 51 is formed by sputtering forming a molybdenum film about 150 nm thick and photolithographically patterning the film. Then, the inter-layer insulating film 41 about 300 nm thick of low-temperature silicon oxide is formed by normal pressure chemical gas phase growth.

Then, lower layer films of the source and drain electrodes 52 and 53, the pixel electrode 15 and the signal line 13 are sputtering formed by sputtering an ITO film about 50 nm and photolithographically patterning the film.

Then, their surface portions are doped with phosphorus by plasma treating them with phosphine ($PH_3$). Then, the laminate film of the island semiconductor film 54 and the first gate insulating film 55, is formed by successively forming a non-impurity-doped amorphous silicon layer about 50 nm thick and a low-temperature silicon nitride film of the same thickness y plasma chemical gas phase growth and patterning these films.

The plasma chemical gas phase growth is carried out by holding the substrate temperature at about 300 degrees C. In this process, phosphorus in surface portions of the source and drain electrodes 52 and 53 are thus diffused in the intrinsic amorphous silicon film, thus forming the n-type semiconductor thin film 57 about 5 nm and effecting electric connection of the source and drain electrodes to the semiconductor layer.

Then, the signal line 13 is formed by sputtering forming a molybdenum layer about 150 nm thick and lithographically patterning the film.

Then, the second gate insulating film 42 about 300 nm thick of low-temperature silicon nitride is formed by plasma chemical gas phase growth, and is photoliothographically formed with a hole 59 over the pixel electrode 15 and the terminal contact hole 25 over the metal film 21 of the terminal electrode part.

Then, the gate electrode 56, the scan line 12 and the metal film 23 of the terminal electrode part are formed by sputtering forming an aluminum/titanium/tantalum film about 300 nm thick and photolithographically patterning the film. Then, like Embodiment 2, their surfaces are covered with the insulating film 31 as an aluminum oxide film about 200 nm thick by anodically oxidizing their surfaces in an oxidizing solution mainly composed of tartaric acid. Alternately, like Embodiment 1, their surfaces are covered with the insulating film 31 as a laminate film consisting of an aluminum hydroxide film (i.e., upper film) about 150 nm thick and an aluminum oxide film (i.e., upper film) about 100 nm thick by a hot water treatment carried out at 700 degrees C for about 20 minutes. Finally, annealing is made to complete the substrate with the TFTs (FIG. 13(*a*)).

Afterwards, the substrate with the TFTs and the other substrate are subjected to orientation film printing and sintering, and then to rubbing. Then, the two substrates are held to define A space between them, and the space is filled with liquid crystal (FIG. 13(*b*)).

Then in the final step of the cell formation process, the insulating film 31 of the connecting parts of the terminal electrodes are selectively etched off, thus completing the liquid crystal display panel (FIG. 13(*c*)).

(Embodiment 4)

Figure 7A:
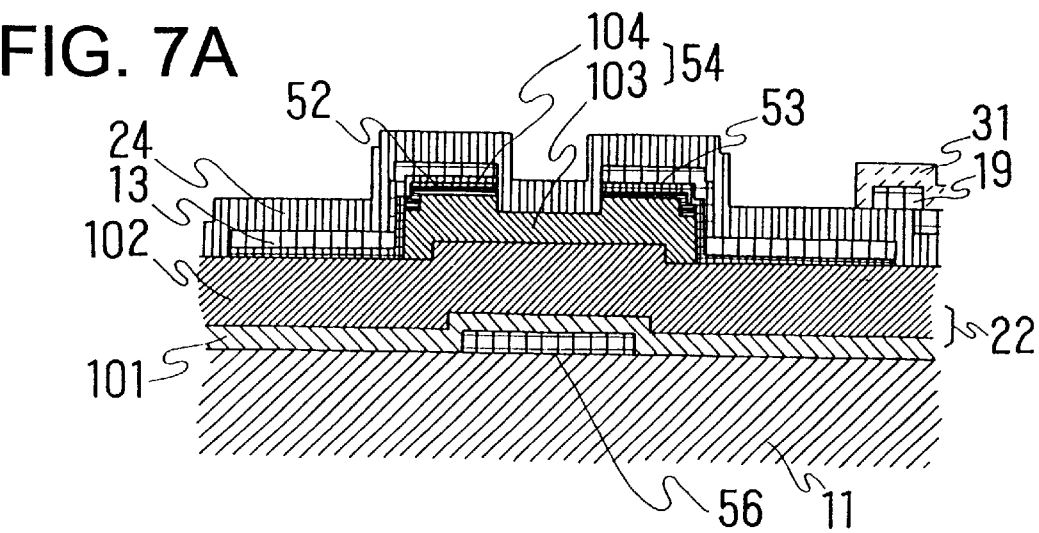
FIGS. 7(a) and 7(b) are a sectional view and a plan view showing a switching element (TFT) part in a one-pixel part of the active matrix substrate of the liquid crystal display panel.
Figure 7B:
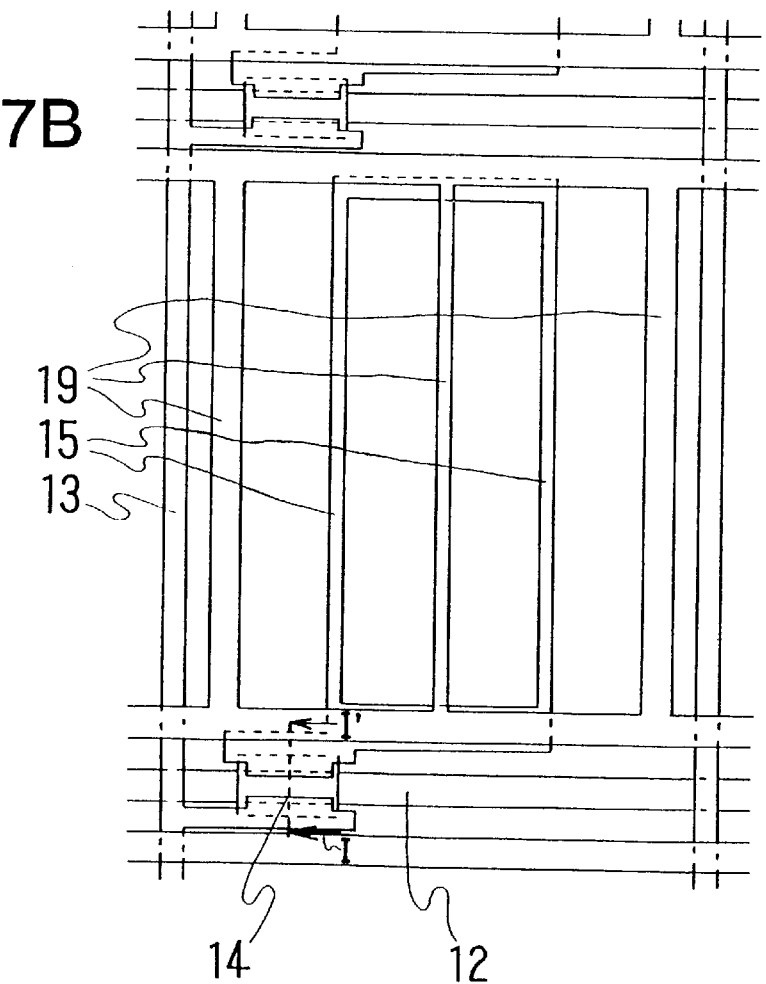

FIG. 6(*a*) is a sectional view taken along line I–I', in short side direction, showing a different modification (Embodiment 4) Embodiment 3 of the liquid crystal display panel according to the present invention. FIG. 6(*b*) is a plan view showing the same display panel. FIG. 7(*a*) is a sectional view showing a switching element (TFT) part in a one-pixel part of the active matrix substrate of the display panel. FIG. 7(*b*) is a plan view showing the same one-pixel part.

Embodiment 4 of the liquid crystal display panel, as shown in FIG. 14, comprises an active matrix substrate 1, another substrate 2 and liquid crystal 4 intervening between the substrates 1 and 2. Embodiment 4 is an example of the liquid crystal display panel of transversal electric field type, with the opposed electrode formed on the active matrix side.

Referring to FIGS. 6(*a*) and 6(*b*), terminal electrodes are formed by selectively forming a metal film 21 having 200 nm thick of aluminum/neodymium alloy on the transparent substrate 11 having 0.7 mm thick of glass, forming an inter-layer insulating film (gate insulating film) 22 as the laminate, for instance, consisting of a low-temperature silicon oxide film about 150 nm thick, formed by sputtering, and a low-temperature silicon nitride film about 150 nm thick, formed by plasma chemical gas phase growth.

Referring to FIGS. 7(*a*) and 7(*b*), the TET 14, of bottom type, is formed by successively forming the transparent substrate 11 0.7 mm thick of glass, comprises a gate electrode 56 about 200 nm of an aluminum/neodymium alloy, an inter-layer insulating film (gate insulating film) 22 formed as a laminate film consisting of a first gate insulating film 101 about 150 nm thick of aluminum/neodymium alloy and a second gate insulating film 102 about 350 nm thick of low-temperature silicon nitride, formed by, plasma chemical gas phase growth, an island semiconductor layer 54 about 350 nm thick of amorphous silicon facing a gate electrode 56 via the inter-layer insulating film 2, a source and a drain electrode 52 and 53 formed as separate film portions about 300 nm thick of molybdenum on the island semiconductor layer 54, and a protective insulating film 24, for instance about 200 nm thick of low-temperature silicon nitride, formed by plasma chemical gas phase growth.

A gate electrode 56 is connected to a scan line 12 also about 200 nm of an aluminum/neodymium alloy, and the source and drain electrodes 52 and 53 are connected to a signal line 13 also about 300 nm thick of molybdenum and a comb-like pixel electrode 15, respectively.

An opposed electrode is covered by an insulating film 3 formed as an aluminum oxide film about 200 nm thick or a laminate film consisting of an aluminum oxide film about 150 nm and aluminum oxide film about 100 nm. The semiconductor layer 54 has the same structure as described before in connection with Embodiment 1 (FIG. 10(*a*) and 10(*b*)).

Embodiment 4 is an example of an active matrix substrate using TFTs having an inverse stagger structure as switching elements. In this case, a scan line terminal 16 is connected directly by the scan line 12 on the transparent substrate 11 to the metal film 21, and a signal line terminal 17 is connected by the signal line on the inter-layer insulating film (gate insulating film) 2 to the metal film 23.

A method of manufacturing Embodiment 3 will now be described. First, the gate electrode 56, the scan line 12 and the metal film 21 of the terminal part are formed by sputtering forming an aluminum/neodymium alloy film about 200 nm thick on the transparent substrate 11 having 0.7 nm thick of glass and photolithographically sputtering these films. Then, a low-temperature oxide silicon about 150 nm thick is high frequency sputtering formed as a first gate insulating film 101.

Then, an island semiconductor layer 54 is formed by successively laminating a low-temperature silicon nitride film about 350 nm thick, a non-impurity-doped amorphous silicon film and a phosphorus-doped amorphous film about 50 nm thick and photolithographically patterning the films.

Then, the terminal contact hole 25 is formed over the metal film 21 of the terminal electrode part.

Then, the source and drain electrodes 52 and 53, the signal line 13, the pixel electrodes 15 and the metal film 23 of the terminal part by sputtering forming a molybdenum film about 300 nm thick and photolithographically patterning the film.

Then, a channel is formed by etching the n-type second semiconductor thin film 104 with the source and drain electrodes 52 and 53 as mask.

Then, a low-temperature silicon nitride film about 200 nm thick is formed as the protective insulating film 24 by plasma chemical gas phase growth, and is then photolithogaphically formed with the terminal contact hole 26 over the metal film 23 of the terminal part.

Then, the opposed electrode 19 and the metal film 64 of the terminal electrode part are formed by sputtering forming an aluminum/neodymium alloy film about 300 nm thick and photlithographically patterning the film. Then, like Embodiment 2, the opposed electrode 19 and the metal film 64 is covered by the insulating film 31, formed as an aluminum oxide film about 200 nm thick by anodically oxidizing them in an oxidizing solution mainly composed of tartaric acid. Alternately, like Embodiment 3, the opposed electrode 19 and the metal film 64 is covered by the insulating film 31, formed as a laminate film consisting of an aluminum hydroxide film (upper layer) about 150 nm thick and an aluminum oxide film (lower layer) about 100 nm thick by carrying out a hot water treatment at 70 degrees C.

Finally, annealing is carried out to complete the substrate with the TFTs. Afterwards, the substrate with the TFTs and the other substrate are subjected to orientation film printing and sintering, and then to rubbing. Then, the two substrates are held to define a space between then, and the space is filled with liquid crystal. Then, as in Embodiments 1 and 2, in the final step of the cell formation process, the insulating film 31 of the connecting part of the terminal electrode are successively etched off, thus completing the liquid crystal display panel.

Figure 9A:
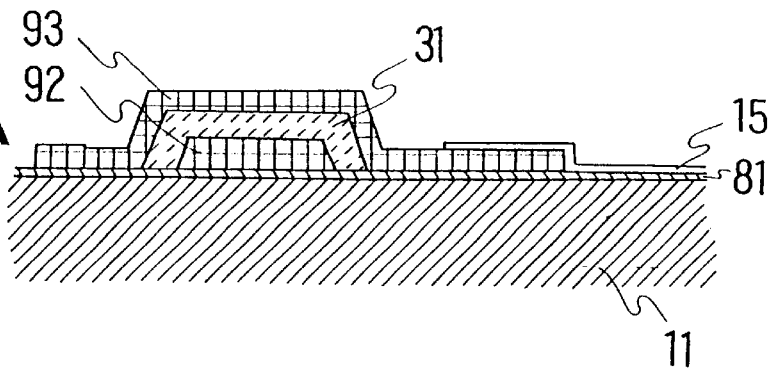
FIGS. 9(a) and 9(b) are a sectional view and a pan view showing a still further modification of the switching element (MIM) part of a one-pixel part of the active matrix substrate according to the third embodiment.
Figure 9B:
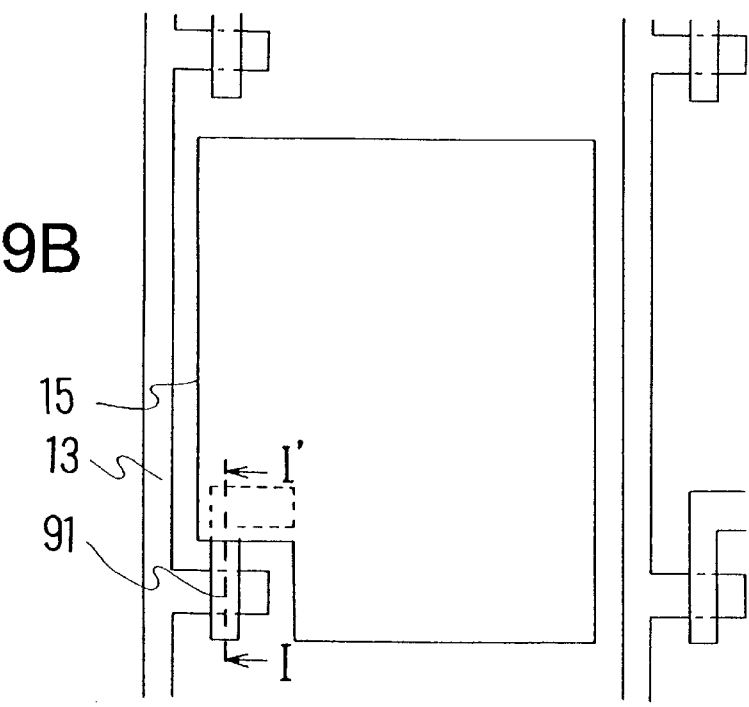

(Embodiment 5) FIG. 8(*a*) is a sectional view taken along line I–I' in FIG. 8(*a*), i.e, in short side direction, showing a terminal electrode part of a further modification (Embodiment 5) of Embodiment 3 of the liquid crystal display panel according to the present invention. FIG. 8(*b*) is a plan view showing the same terminal electrode part. FIG. 9(*a*) is sectional view taken along line I–I' in FIG. 9(*b*), showing a switching element (MIM) part of a one-pixel part of the active matrix substrate of the same display panel. FIG. 9(*b*) is a pan view showing the same one-pixel part.

This liquid crystal display panel, as showing FIG. 14, comprises an active matrix substrate 1, another substrate 2 and liquid crystal intervening between the substrates 1 and 2.

As shown in FIGS. 8(*c*) and 8(*b*), terminal electrodes are formed by selectively forming a metal film 23 about 200 nm thick of an aluminum/titanium/tantalum alloy on an underlying insulating film 81 about 50 nm thick of tantalum oxide, which is formed on a transparent substrate 11 0.7 mm thick of glass.

Referring to FIGS. 9(*a*) and 9(*b*), on an underlying insulating film 81 about 50 nm thick of tantalum oxide, formed on a transparent substrate 11 0.7 nm thick of glass, an MIM 91 is formed by successively laminating a lower electrode 92 as an aluminum/titanium/tantalum alloy about 200 nm thick, an insulating film 31 about 200 nm thick of aluminum oxide covering the lower electrode 92, and an upper electrode 13 about 150 nm thick of chromium.

The lower electrode 92 is connected to a signal line 13 also about 200 nm thick of an aluminum/titanium/tantalum alloy, and the upper electrode 93 is connected to a pixel electrode 15 about 50 nm of ITO. In Embodiment 5 the signal line is directly connected to the metal film 23. The scan line (i.e., scan electrode) is formed on the other substrate side.

A method of manufacturing Embodiment 5 will now be described. First, the lower electrode 92, the signal line 13 and a metal film 23 of the terminal electrode part are formed by successively sputtering laminating a tantalum oxide film about 50 nm and an aluminum/titanium/tantalum alloy about 30 nm thick on a transparent substrate 11 0.7 nm thick of glass and photolithographically patterning the aluminum/titanium/tantalum alloy.

Then, like Embodiment 2, the lower electrode 92, the signal line 13 and the metal film 23 of the terminal electrode part, is covered with the insulating film 31 about 200 nm thick of aluminum oxide, formed by anodically oxidizing them in an oxidizing solution mainly composed of tartaric acid. Then, the upper electrode 93 is formed by sputtering forming a chromium film about 150 nm thick and photolithographically patterning the film.

Then, the pixel electrode 15 is formed by sputtering forming an ITO film about 50 nm thick and photolithographically patterning the film. Finally, annealing is made to complete the substrate with the MIMs. Afterwards, the substrate with the MIMs and the other substrate are subjected to orientation film printing and sintering, and then to rubbing. Then, the two substrates are held to define a space between them, and the space is filled with liquid crystal.

Then in the final step of cell formation process, the insulating film 31 of the connecting parts of terminal electrodes are successively etched off, thus completing the liquid crystal display panel.

While the method of manufacturing Embodiment 3 has been described before as a typical method according to the present invention in connection with FIGS. 13(*a*) and 13(*b*), the same method is also applicable to the other embodiments. In addition, while in the above embodiments the insulating film 32 is selectively removed by wet etching in the final step of the cell formation process, it is also possible to remove the film 3 by mechanically polishing the connecting terminal surface. Furthermore, it is possible to remove the film 31 prior to press bonding the TCP in a liquid crystal module assembling process. Moreover, while the channel etch type TFT has been described as an example of the inverse stagger type TFT in the above embodiments, the present invention is also applicable to a TFT of channel protection type.

The fact that a laminate film consisting of an aluminum hydroxide (i.e., an upper layer) and an aluminum oxide (i.e., a lower layer) is formed in the case of forming the insulating film 31 by a hot water treatment, is experimentally confirmed by the inventor, and is different from the prior art technique disclosed in the Japanese Patent Disclosure No. 60-260920. This is so because according to the disclosure probably the analysis is made only about the film surface.

As shown above, an insulating film of aluminum oxide or as a laminae film consisting of an aluminum oxide film and an aluminum hydroxide film, is preliminarily formed on the surface of the connecting terminal, and is selectively removed before the cell formation process or press bonding the TCP in the module formation process. It is thus possible to eliminate the adverse effects of oxidizing aluminum on the connecting terminal surface in the heat treatment processes (such as the annealing in the array formation process or the orientation film sintering in the cell formation process) and ensure that the initial forced contact resistance in the terminal electrode part is low and stable.

In addition, by setting the thickness of the insulating film 3 to be 100 nm or above, it is possible to use alkali or acid for the washing in the cell formation process and eliminate the generation of hilloc on the aluminum surface of the terminal electrode part, thus improving the yield and the reliability.

Although a natural aluminum oxide film is formed on the surface of the connecting terminal part, its thickness is no greater than 5 nm, and it can be readily broken apart by ACF particles when press bonding the TCP and ensure stable connection resistance and reliability.

Figure 16A:
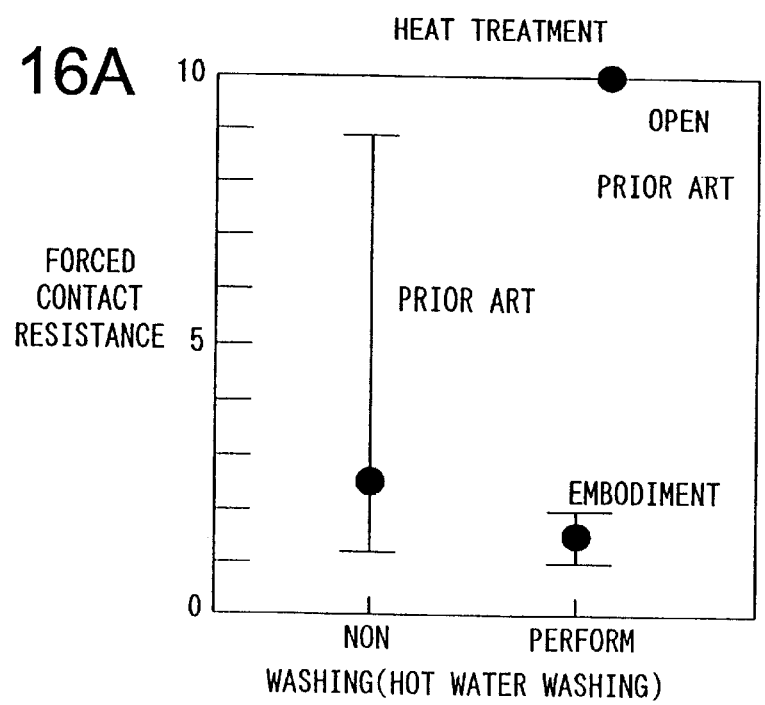
FIGS. 16(a) and 16(b) show the initial forced contact resistance and the forced contact resistance after a high temperature, high relative humidity preservation test conducted under conditions of 60 degrees C and 90%.
Figure 16B:
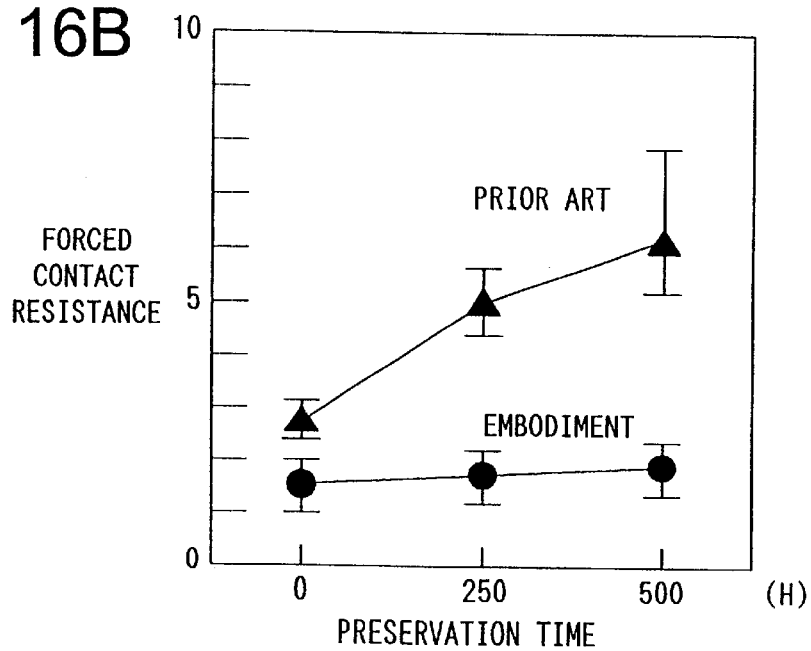
Figure 17:
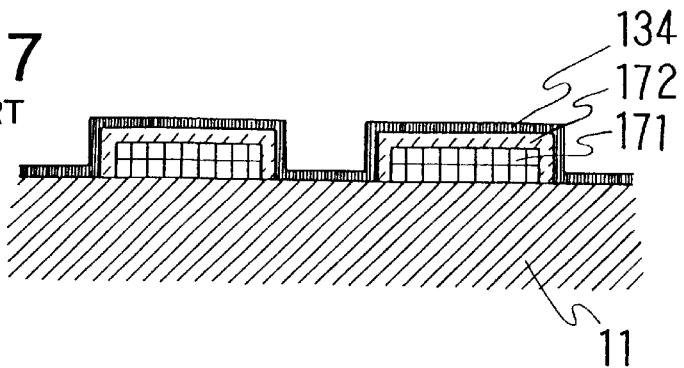
FIG. 17 is a sectional view of the substrate of thermal write type of liquid crystal display disclosed in Japanese Patent Laid-Open No. 60-260920.
Figure 18:
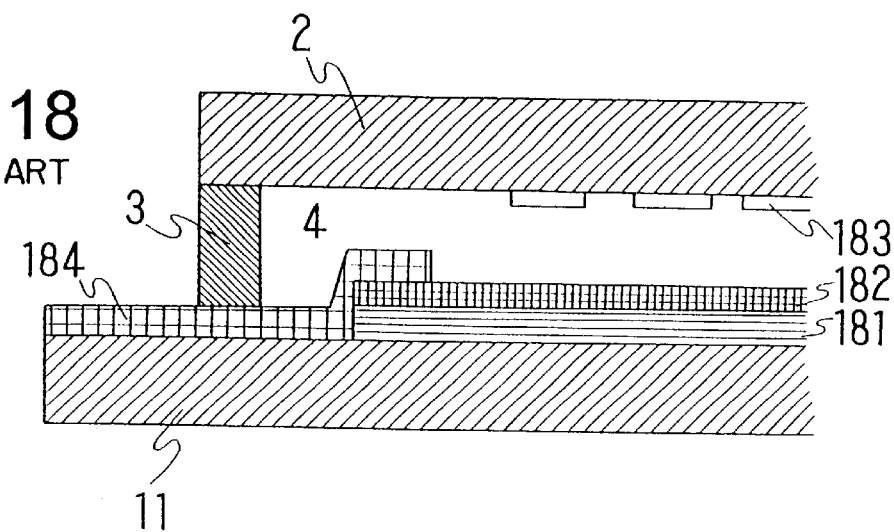
FIG. 18 is a sectional view of the active matrix substrate of electro-optical apparatus of active matrix type disclosed in Japanese Patent Laid-Open No. 3-280021.
Figure 19:
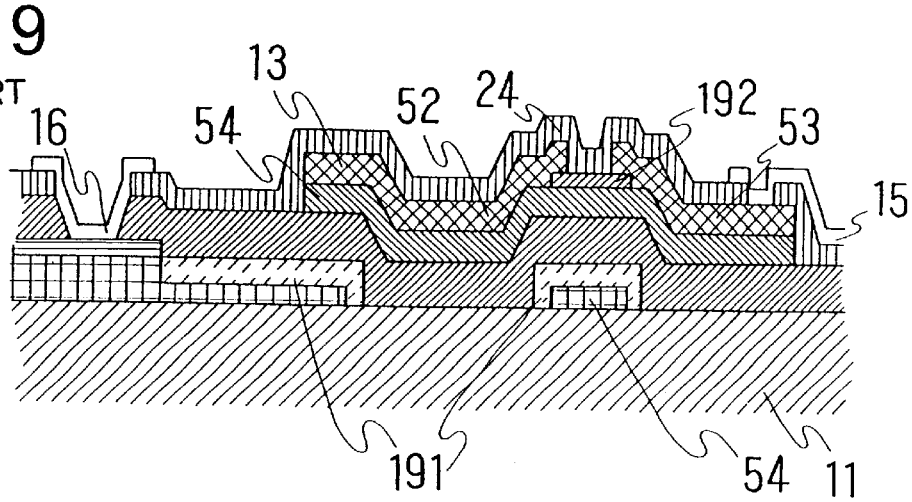
FIG. 19 is a sectional view of the thin film transistor array substrate disclosed in Japanese Patent Laid-Open No. 8-122822.

FIGS. 16(*a*) and 16(*b*) show examples of the forced contact resistance in the case of Embodiment 3 of the present invention and the prior art aluminum terminal case. Specifically, FIG. 16(a) shows the initial forced contact resistance, and FIG. 16(b) shows the forced contact resistance after a high temperature, high relative humidity preservation test conducted under conditions of 60 degrees C and 90%. The resistance shown is the resultant resistance of 20 terminals connected in series. The ACF used was of a new version of "CP7131" manufactured by Sony Chemical. The press bonding was conducted under conditions of 180 degrees C and 30 Kg/cm$^2$, the heat treatment was conducted under conditions of 3,300 degrees C an 30 minutes, and the hot water treatment in the washing was conducted under conditions of 70 degrees C and 10 minutes.

As is obvious from FIGS. 16(a) and 16(b), in the prior art aluminum terminal manufacture method an insulating film is formed on the aluminum terminal surface, and it is thus impossible to obtain electric connection at the terminal electrode part. In contrast, according to the present invention it is possible to obtain a low and stable initial contact force resistance and thus improve the connection reliability.

As has been described in the foregoing, according to the present invention it is possible to dispense with the photolithography once in the array formation process, thus improving the yield and the reliability. This is so because it is possible to form and remove the insulating film of aluminum oxide or aluminum hydroxide in the terminal electrode part without any photo-mask, thus reducing the number of steps involved.

It is also possible to obtain a low and stable initial forced contact resistance in the terminal electrode part and improve the connection reliability as well. This is so because an insulating film of aluminum oxide or aluminum hydroxide is preliminarily formed on at least the surface of the connecting electrode of the terminal part, which is to be in contact with the TPC, and selectively removed in the final step of the cell formation process, so that it is possible to prevent oxidization or hydroxidization of the connecting surface of aluminum in the subsequent heat treatment processes (i.e., the annealing in the array formation process and the orientation film sintering in the cell formation process), the hot water treatment in the washing process and steam drying.

Furthermore, it is possible to reduce display irregularities and improve the yield and there liability. This is so because an insulating film of aluminum oxide or aluminum hydroxide is preliminarily formed to cover exposed aluminum of the terminal electrode part, so that it is possible to adopt washing with alkali or acid in the cell formation process and sufficiently remove alkali ions and chlorine ions.

Still further, in Embodiments 2 and 3, it is possible to protect the uppermost layer aluminum lead lines electrodes in the pixel part from water intrusion from the orientation film or the like and thus prevent corrosion of aluminum.

Moreover, it is possible to improve the yield and productivity in the cell formation process. This is so because an insulating film of aluminum oxide or aluminum hydroxide is preliminarily formed on the aluminum surface of the terminal electrode part, so that it is possible to prevent hilloc generation and also prevent damages to the orientation film in the terminal electrode part and contamination of the rubbing roll in the rubbing in the cell formation process.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A liquid crystal display panel including an active matrix substrate, another substrate facing the active matrix substrate and a liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements and connecting electrodes provided on leading end portions of the scan lines and signal lines are formed; and at least a connecting part of the connecting electrodes is formed by using aluminum or alloy mainly composed thereof, wherein a protective insulating film is formed on at least the connecting electrodes and has terminal contact holes reaching the connecting part of the connecting electrodes, and wherein the connecting part is a connection with respect to an external drive circuit.

2. A liquid crystal display panel including an active matrix substrate, another substrate facing the active matrix substrate and a liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements, opposite electrodes and connecting electrodes provided on leading end portions of the scan lines and signal lines are formed; and at least a connecting part of the connecting electrodes is formed by using aluminum or alloy mainly composed thereof, wherein a protective insulating film is formed on at least the connecting electrodes and has terminal contact holes reaching the connecting part of the connecting electrodes, and wherein the connecting part is a connection with respect to an external drive circuit.

3. A liquid crystal display panel including an active matrix substrate, another substrate facing the active matrix substrate and a liquid crystal intervening between the two substrates, wherein:

the active matrix substrate comprises a transparent substrate, on which a plurality of signal lines, switching elements provided on the signal lines, pixel electrodes connected to the switching elements and connecting electrodes provided on leading end portions of the signal lines are formed; and at least a connecting part of the connecting electrodes is formed by using aluminum or alloy mainly composed thereof, wherein a protective insulating film is formed on at least the connecting electrodes and has terminal contact holes reaching the connecting part of the connecting electrodes, and wherein the connecting part is a connection with respect to an external drive circuit.

4. A liquid crystal display panel including an active matrix substrate, another substrate facing the active matrix substrate and a liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements and connecting electrodes provided on leading end portions of the scan lines and signal lines are formed;

at least a connecting part of the connecting electrodes is formed by using aluminum or alloy mainly composed thereof; and in an active matrix substrate area with the intervening liquid crystal present therein, an insulating film covers the surfaces of uppermost layer scan lines, signal lines and electrodes of the switching elements, wherein the insulating film consists of laminate film of aluminum oxide and aluminum hydroxide, and wherein the connecting part is a connection with respect to an external drive circuit.

5. A liquid crystal display panel including an active matrix substrate, another substrate facing the active matrix substrate and a liquid crystal intervening between the two substrates, wherein:

the active matrix substrate comprises a transparent substrate, on which a plurality of scan lines, a plurality of signal lines crossing the scan lines, switching elements provided at the intersections of the scan lines and signal lines, pixel electrodes connected to the switching elements, opposite electrodes and connecting electrodes provided on leading end portions of the scan lines and signal lines are formed;

at least a connecting part of the connecting electrodes is formed by using aluminum or alloy mainly composed thereof; and in an active matrix substrate area with the intervening liquid crystal present therein, an insulating film covers the surfaces of uppermost layer scan lines, signal lines, electrodes of the switching elements and opposed electrodes, wherein the insulating film consists of laminate film of aluminum oxide and aluminum hydroxide, and wherein the connecting part is a connection with respect to an external drive circuit.

6. A liquid crystal display panel including an active matrix substrate, another substrate facing the active matrix substrate and a liquid crystal intervening between the two substrates, wherein:

the active matrix substrate comprises a transparent substrate, on which a plurality of signal lines, a plurality of switching elements provided at the plurality of signal lines, pixel electrodes connected to the switching elements and connecting electrodes provided on leading end portions of the signal lines are formed;

at least a connecting part of the connecting electrodes is formed by using aluminum or alloy mainly composed thereof; and portions of the signal lines in an area with the intervening liquid crystal therein are covered by an insulating film, wherein the insulating film consists of laminate film of aluminum oxide and aluminum hydroxide, and wherein the connecting part is a connection with respect to an external drive circuit.

7. The liquid crystal display panel according to one of claims 4 to 6, wherein a protective insulating film is formed on at least the connecting electrodes and has terminal contact holes reaching the connecting electrodes.

8. The liquid crystal display panel according to one of claims 4 to 6, wherein no protective insulating film is formed on the connecting electrodes.

* * * * *

UNITED STATES PATENT AND TRADEMARK OFFICE
CERTIFICATE OF CORRECTION

PATENT NO.      : 6,259,495 B1
DATED           : July 10, 2001
INVENTOR(S)     : Akitoshi Maeda It is certified that error appears in the above-identified patent and that said Letters Patent is hereby corrected as shown below:

Column 1,
Line 28, delete "50 $\mu$m" and insert therefor -- 5 $\mu$m --.

Column 2,
Line 46, delete "discloses" and insert therefor -- disclosed --.
Line 50, before "a" insert -- and --.

Column 5,
Line 29, delete "plurarity" and insert therefor -- plurality --.

Column 7,
Line 62, delete "pan" and insert therefor -- plan --.

Column 8,
Line 9, delete "sectional views and a plan" and insert therefor -- a sectional view and a plan --.

Column 9,
Line 54, delete "Of" and insert therefor -- of --.

Column 12,
Line 52, delete "hotographically" and insert therefor -- photolithographically --.

Column 13,
Line 54, delete "photographically" and insert therefor -- photolithographically --.

Column 14,
Line 40, delete "FIG. 12(b)" and insert therefor -- FIG. 12(a) --.
Line 63, after "11" insert --,--.

Column 15,
Line 7, delete "lithogrphically" and insert therefor -- lithographically --.

Figure 13A:
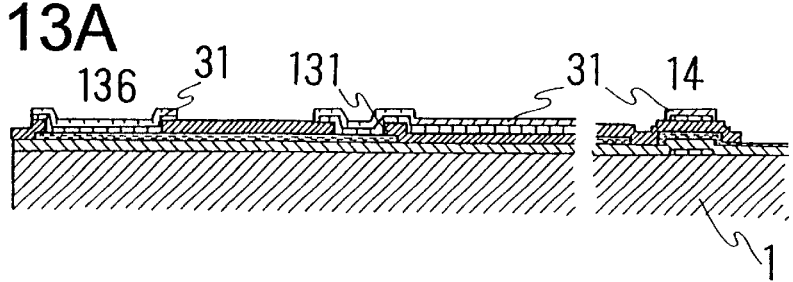
FIGS. 13(a), 13(b) and 13(c) are drawings showing a method of manufacturing of the third embodiment shown in FIGS. 4 and 5.
Figure 13B:
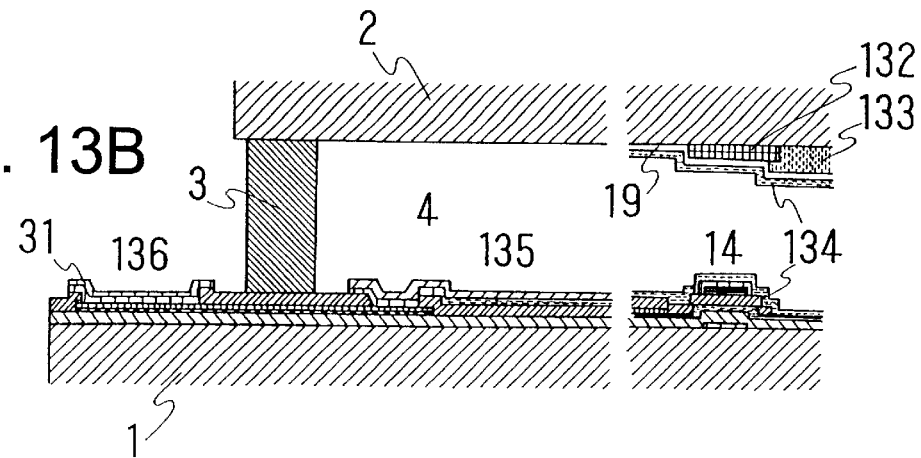
Figure 13C:
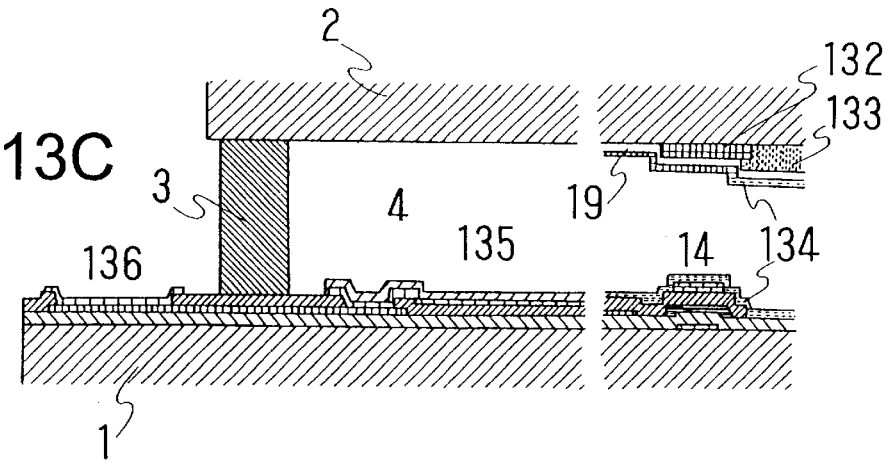

Column 16,
Line 48, delete "FIGS. 13(a) to 13(b)" and insert therefor -- FIGS. 13(a) to 13(c) --.
Line 64, delete "y" and insert therefor --by--.

UNITED STATES PATENT AND TRADEMARK OFFICE
CERTIFICATE OF CORRECTION

PATENT NO. : 6,259,495 B1
DATED : July 10, 2001
INVENTOR(S) : Akitoshi Maeda

It is certified that error appears in the above-identified patent and that said Letters Patent is hereby corrected as shown below:

Column 17,
Line 12, delete "photoliothographically" and insert therefor -- photolithographically --.
Line 34, delete "A" and insert therefor -- a --.

Column 19,
Line 31, delete "pan view" and insert therefor -- plan view --.

Column 20,
Line 44, delete "laminae" and insert therefor -- laminate --.
Line 58, delete "hilloc" and insert therefor -- hillocks --.

Column 21,
Line 11, delete "an" and insert therefor -- and --.
Line 56, delete "hilloc" and insert therefor -- hillock --.

Signed and Sealed this

First Day of October, 2002

Attest:

JAMES E. ROGAN
Attesting Officer  *Director of the United States Patent and Trademark Office*